US007249950B2

(12) United States Patent
Freeman et al.

(10) Patent No.: US 7,249,950 B2
(45) Date of Patent: Jul. 31, 2007

(54) DISPLAY APPARATUS FOR TEACHING WRITING

(75) Inventors: Richard Glen Freeman, San Carlos, CA (US); Elecia White, San Jose, CA (US); Ed Annunziata, Montara, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 152 days.

(21) Appl. No.: 10/961,999

(22) Filed: Oct. 7, 2004

(65) Prior Publication Data

US 2005/0106538 A1 May 19, 2005

Related U.S. Application Data

(60) Provisional application No. 60/512,326, filed on Oct. 17, 2003, provisional application No. 60/510,809, filed on Oct. 10, 2003.

(51) Int. Cl.
*G09B 19/00* (2006.01)
(52) U.S. Cl. .................. 434/155; 434/156; 434/163
(58) Field of Classification Search ............... 434/167, 434/155, 163
See application file for complete search history.

(56) References Cited

U.S. PATENT DOCUMENTS

| | | | |
|---|---|---|---|
| 2,917,838 A | 12/1959 | Neugass | |
| 3,512,273 A | 5/1970 | Baker, Jr. et al. | |
| 3,662,077 A | 5/1972 | Kersten | |
| 4,052,798 A | 10/1977 | Tomita et al. | |
| 4,288,537 A | 9/1981 | Knetzger | |
| 4,403,965 A | 9/1983 | Hawkins | |
| 4,525,148 A | 6/1985 | Narayanan | |
| 4,633,436 A | 12/1986 | Flurry | |
| 4,687,200 A | 8/1987 | Shirai | |

(Continued)

FOREIGN PATENT DOCUMENTS

GB      2106693 A   *   4/1983

OTHER PUBLICATIONS

Battenberg, et al.; Touch Screen Versus Keyboard: A Comparison of Task Performance of Young Children; *Journal of Special Education Technology*; Fall 1989; pp. 24-28; vol. X; No. 1.
Eiser, Leslie; Picks of the Month, Bailey's Book House; *Technology & Learning*; Sep. 1993; pp. 8-9; vol. 14; No. 1.
Piernot, et al.; Designing the PenPal: Blending Hardware and Software in a User-Interface for Children; *Proceedings of the Conference on Computer Human Interaction (CHI '95)*; 1995; pp. 511-518; Chicago.

*Primary Examiner*—Robert E. Pezzuto
*Assistant Examiner*—Cameron Saadat
(74) *Attorney, Agent, or Firm*—Townsend and Townsend and Crew LLP

(57) ABSTRACT

Apparatuses and methods are provided directed at teaching writing, such as printing, cursive, and calligraphy, to users of all ages. Typically, the embodiments are directed toward teaching children the basic skills of writing. However, it may be appreciated that the embodiments may be utilized by users of all ages. In particular, embodiments of the invention can be used to teach the skill of writing and learning letters of the English alphabet to foreigners. Or, embodiments of the invention can be used to teach English speakers various foreign alphabets. For example, embodiments may provide instruction in writing Arabic letters, Greek letters, or Chinese or Japanese characters, to name a few. Additionally, embodiments of the invention may be used to teach artistic forms of writing, such as calligraphy, script, or various fonts.

9 Claims, 20 Drawing Sheets

U.S. PATENT DOCUMENTS

| | | |
|---|---|---|
| 4,793,810 A | 12/1988 | Beasley, Jr. |
| 4,884,972 A | 12/1989 | Gasper |
| 4,932,904 A | 6/1990 | Ichitsubo |
| 4,968,255 A | 11/1990 | Lee et al. |
| 4,969,647 A | 11/1990 | Mical et al. |
| 5,095,798 A | 3/1992 | Okada et al. |
| 5,134,391 A | 7/1992 | Okada |
| 5,161,803 A | 11/1992 | Ohara |
| 5,184,830 A | 2/1993 | Okada et al. |
| 5,207,426 A | 5/1993 | Inoue et al. |
| 5,213,327 A | 5/1993 | Kitaue |
| 5,291,189 A | 3/1994 | Otake et al. |
| 5,295,837 A | 3/1994 | Gilano et al. |
| 5,327,158 A | 7/1994 | Takahashi et al. |
| 5,337,069 A | 8/1994 | Otake et al. |
| 5,364,272 A | 11/1994 | Herman et al. |
| 5,371,512 A | 12/1994 | Otake et al. |
| 5,372,511 A | 12/1994 | Keung |
| 5,400,052 A | 3/1995 | Otake et al. |
| 5,409,381 A | 4/1995 | Sundberg et al. |
| 5,426,763 A | 6/1995 | Okada |
| 5,483,257 A | 1/1996 | Otake et al. |
| 5,484,288 A | 1/1996 | DelGigante |
| 5,485,176 A | 1/1996 | Ohara |
| 5,495,266 A | 2/1996 | Otake et al. |
| 5,509,663 A | 4/1996 | Otake et al. |
| 5,511,980 A | 4/1996 | Wood |
| 5,596,698 A | 1/1997 | Morgan |
| 5,604,517 A | 2/1997 | Filo |
| 5,608,424 A | 3/1997 | Takahashi et al. |
| 5,636,995 A | 6/1997 | Sharpe |
| 5,670,992 A | 9/1997 | Yasuhara |
| 5,681,170 A | 10/1997 | Rieber et al. |
| 5,708,457 A | 1/1998 | Otake et al. |
| 5,730,602 A | 3/1998 | Gierhart |
| 5,766,016 A | 6/1998 | Gierhart |
| 5,769,643 A | 6/1998 | Stevens |
| 5,813,861 A | 9/1998 | Wood |
| 5,820,385 A | 10/1998 | Ohashi et al. |
| 5,855,483 A | 1/1999 | Collins |
| 5,944,533 A | 8/1999 | Wood |
| 5,951,399 A | 9/1999 | Burrell et al. |
| 6,042,478 A | 3/2000 | Ng |
| 6,049,813 A | 4/2000 | Danielson et al. |
| 6,120,379 A | 9/2000 | Tanaka et al. |
| 6,183,262 B1 | 2/2001 | Tseng |
| 6,215,901 B1 * | 4/2001 | Schwartz .................... 382/186 |
| 6,241,611 B1 | 6/2001 | Takeda et al. |
| 6,266,685 B1 | 7/2001 | Danielson et al. |
| 6,295,052 B1 | 9/2001 | Kato et al. |
| 6,315,669 B1 | 11/2001 | Okada et al. |
| 6,322,447 B1 | 11/2001 | Okada et al. |
| 6,332,840 B1 | 12/2001 | Nishiumi et al. |
| 6,356,443 B2 | 3/2002 | Jenks et al. |
| 6,383,079 B1 | 5/2002 | Takeda et al. |
| 6,416,329 B1 | 7/2002 | Hirota et al. |
| 6,419,584 B1 | 7/2002 | Sakamoto et al. |
| 6,435,969 B1 | 8/2002 | Tanaka et al. |
| 6,461,242 B2 | 10/2002 | Takeda et al. |
| 6,494,786 B2 | 12/2002 | Oshita |
| 6,506,119 B1 | 1/2003 | Burrell et al. |
| 6,520,501 B1 | 2/2003 | Naghi et al. |
| 6,535,204 B2 * | 3/2003 | Sun .......................... 345/173 |
| 2001/0036862 A1 | 11/2001 | Kitamori et al. |
| 2002/0021289 A1 | 2/2002 | Combs et al. |
| 2002/0039924 A1 | 4/2002 | Okada et al. |
| 2002/0080112 A1 | 6/2002 | Braun |
| 2002/0094852 A1 | 7/2002 | Fujioka et al. |
| 2002/0137566 A1 | 9/2002 | Tomizawa et al. |
| 2002/0173360 A1 | 11/2002 | Tanaka et al. |
| 2003/0030619 A1 | 2/2003 | Martin et al. |
| 2003/0067465 A1 | 4/2003 | Jelinek et al. |

* cited by examiner

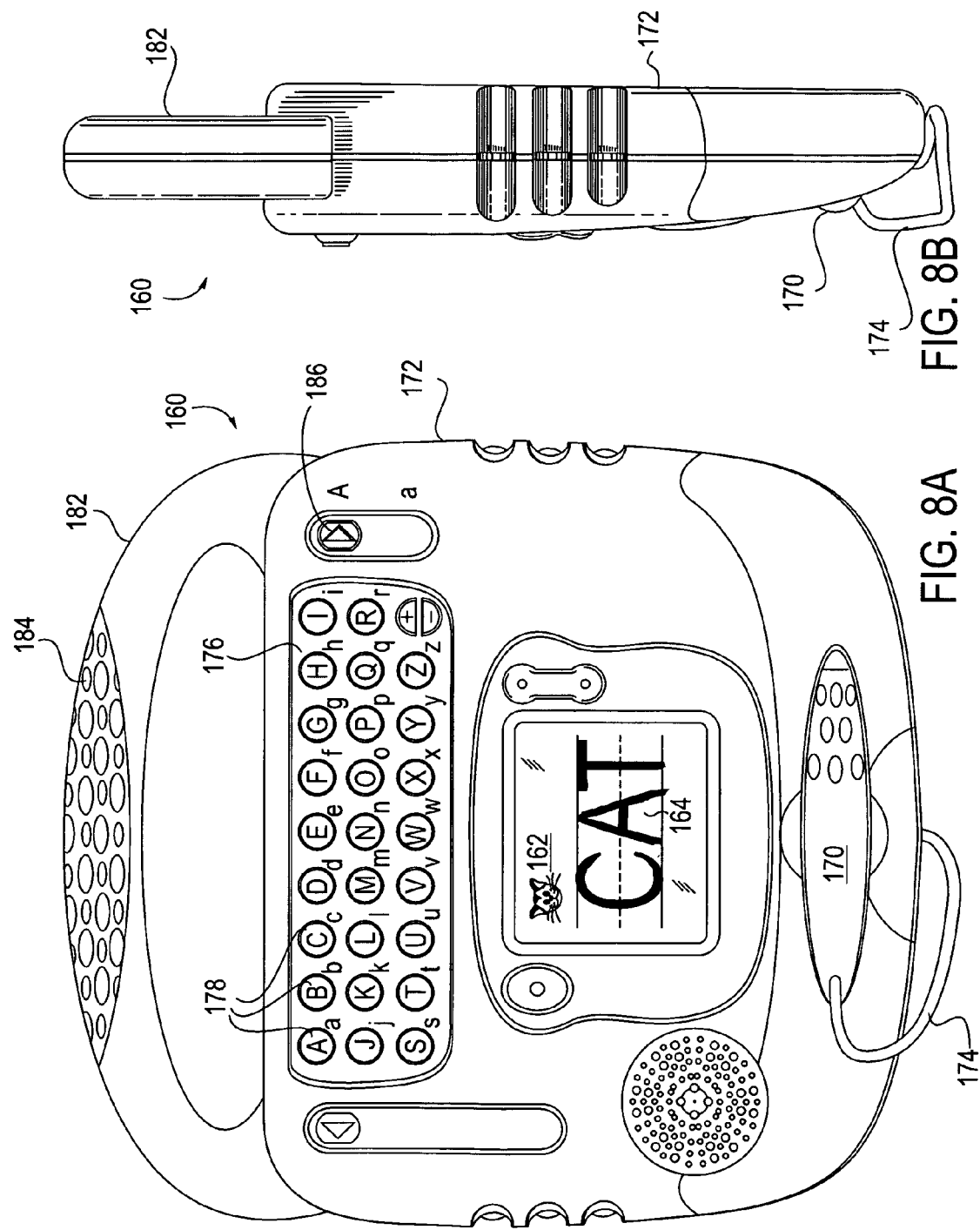

FIG. 8J
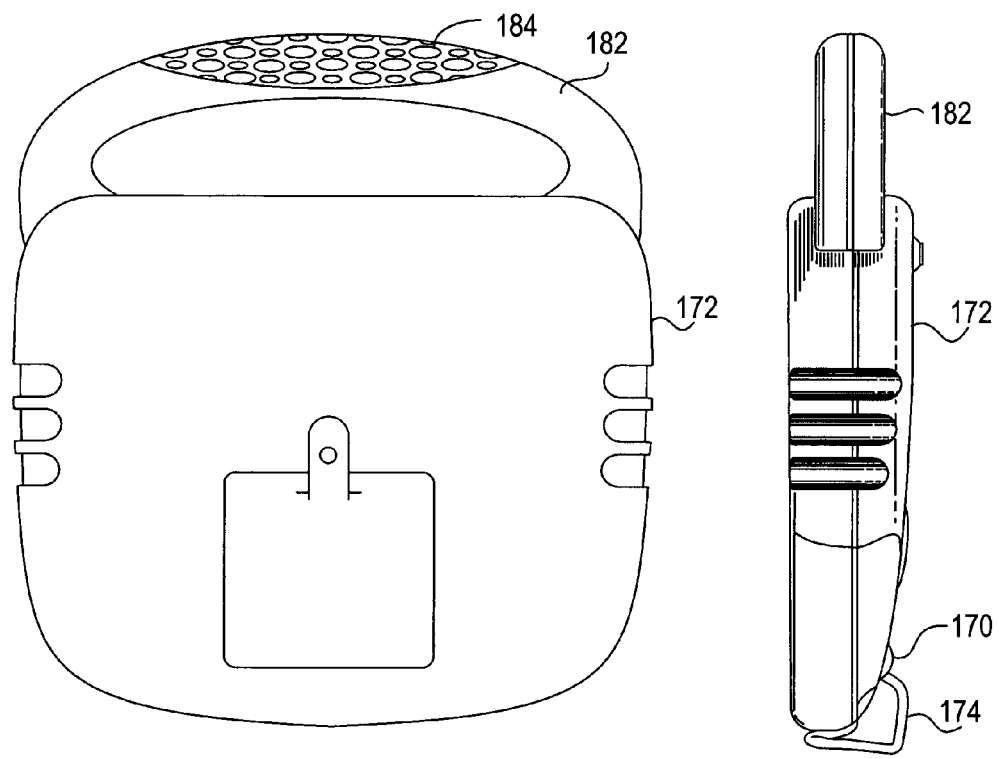
FIG. 8H
FIG. 8I

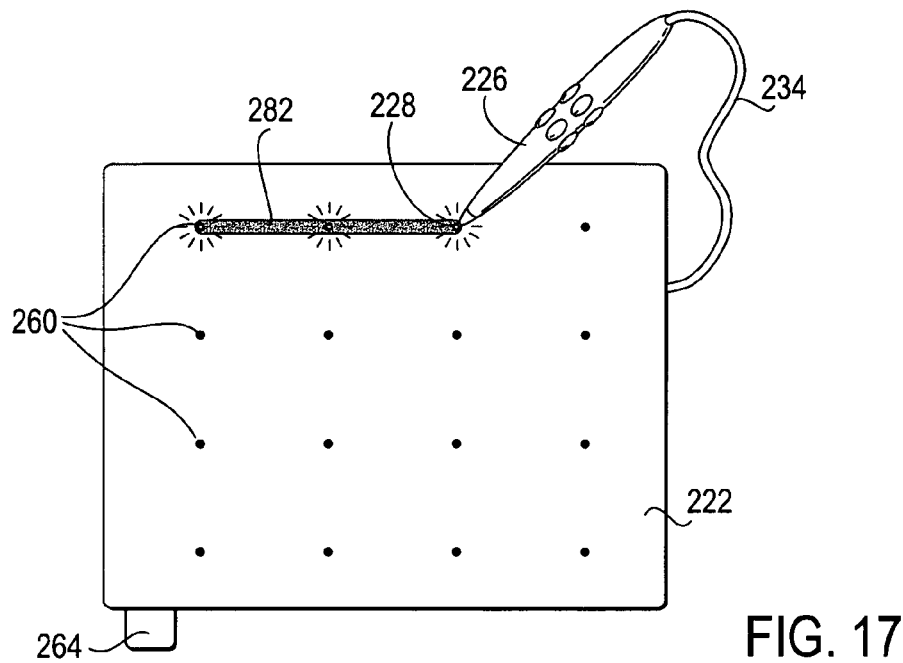
FIG. 17
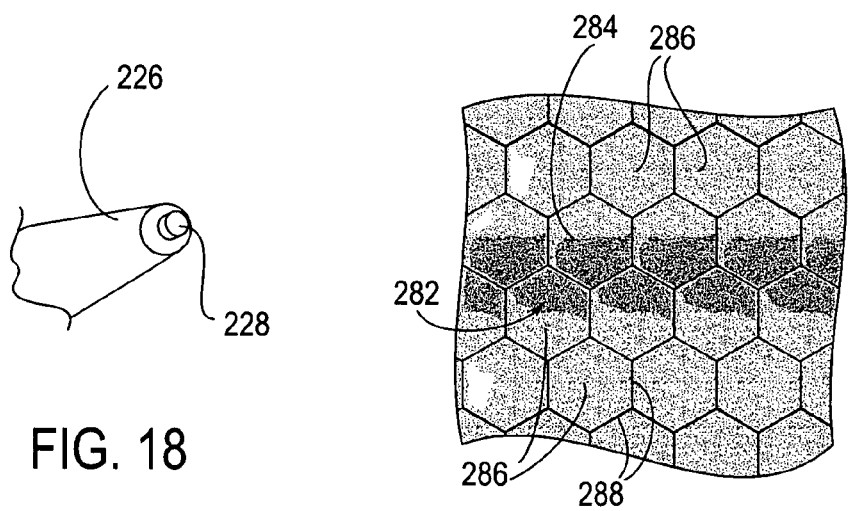
FIG. 18
FIG. 19

DISPLAY APPARATUS FOR TEACHING WRITING

CROSS-REFERENCES TO RELATED APPLICATIONS

This application is a non-provisional of and claims the benefit of the filing dates of U.S. Provisional Application Nos. 60/510,809, filed on Oct. 10, 2003, and 60/512,326 filed on Oct. 17, 2003, all of which are herein incorporated by reference in their entirety for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Writing is a fundamental aspect of learning and communicating in our society. Although the introduction of computers and the adoption of word processing by younger and younger generations has introduced typing as a significant means of writing, the manual practice of handwriting is still a necessary skill and provides a unique aspect of the learning process.

Traditionally, such learning has been achieved in a classroom or tutorial setting wherein the pupil is guided by an instructor. The pupil is provided with a sheet of plain lined paper to practice the skill of writing. Or, the pupil is provided with a worksheet having blanks for writing text or numbers in relation to elements printed on the page. In either case, the pupil is generally directed by the instructor as to the tasks to be performed on the page. And, in the case of the worksheet, the pupil may be required to read to be able to follow the instructions.

It is desired to provide a means for learning that does not require the continuous presence of an instructor or the ability to read. Further it is desired to provide a means for learning which is stimulating, engaging and fosters interest in learning. These objectives are addressed, individually and collectively, by the present invention.

BRIEF SUMMARY OF THE INVENTION

The present invention is directed at teaching writing, such as printing, cursive, and calligraphy, to users of all ages. Typically, the embodiments are directed toward teaching children the basic skills of writing. Thus, many of the embodiments are described and illustrated in forms which appeal to children and utilize auditory and visual prompts which do not require advanced skills, such as reading. Further, embodiments of the invention also improve hand eye coordination and fine motor skills which are beneficial to developing children. However, it may be appreciated that the embodiments may be utilized by users of all ages. In particular, embodiments of the invention can be used to teach the skill of writing and learning letters of the English alphabet to foreigners. Or, embodiments of the invention can be used to teach English speakers various foreign alphabets. For example, embodiments may provide instruction in writing Arabic letters, Greek letters, or Chinese or Japanese characters, to name a few. Additionally, embodiments of the invention may be used to teach artistic forms of writing, such as calligraphy, script, or various fonts.

Various embodiments of learning apparatuses are provided which teach the user writing skills. A significant aspect of these embodiments is that they provide techniques that directly mimic writing on real paper. Rather than steering a mouse to direct a pointer on a computer monitor, the user is able to "write" directly on a screen with a stylus. Thus, the writing techniques provided to the user can transfer to real pen and paper smoothly.

Embodiments of the present invention can have multiple modes of learning and/or can provide audio and visual feedback to a user. Suitable modes of operations in educational apparatuses are discussed in U.S. patent application Ser. No. 09/886,399, and U.S. Pat. Nos. 4,403,965, 5,944,533 and 5,813,861, all of which are herein incorporated by reference in their entirety. In addition to writing, embodiments of the invention may also teach a child how to read, phonics, etc.

In a first embodiment of the present invention, an interactive learning apparatus is provided comprising (a) a housing, (b) a display screen on the housing, (c) an electronic position location system, wherein the electronic position location system includes a processor that is capable of determining a location of a selected region of the display screen, (d) a stylus for selecting regions on the display screen, and (e) a memory device operatively coupled to the processor, the memory device comprising (i) code for displaying an instructional stroke on the display screen, (ii) code for displaying a starting point for drawing the instructional stroke on the display screen, and (iii) code for displaying a user mark on the display screen drawn by a user with the stylus using the starting point as a reference point.

Typically, the instructional stroke forms at least a portion of a letter of an alphabet. However it may be appreciated that the instructional stroke may form other images, such as numbers, symbols, figures, etc. In some embodiments, the instructional stroke is surrounded by a boundary region. In these embodiments, the memory device includes code for providing feedback to the user regarding the location of the user mark in relation to the boundary region. For example, the apparatus may include an audio output device coupled to the processor unit and the feedback may then comprise an audio output. When the user mark is within the boundary region, the audio output may comprise a supportive phrase. When the user mark is outside of the boundary, the audio output may comprise a coaching phrase. Alternatively or in addition, such feedback may comprise displaying the user mark having a differing visual appearance or removal of the user mark from the display screen. For example, if the user creates a user mark that travels outside of the boundary region, the user mark may see a user mark having a different color or appearance or the user mark may simply disappear from the screen so that the user is able to redraw the line in a more correct manner.

The user may also receive feedback regarding the quality of the line, even if it is drawn entirely within a boundary region. For example, in some embodiments, the memory device further comprises code for providing feedback to the user regarding stroke direction of the user mark in relation to stroke direction of the instructional stroke. And, in some embodiments, the memory device further comprises code for providing feedback to the user regarding completion of the user mark in relation to the instructional stroke. In any case, as the user is creating their user marks, the instructional strokes remain so the user can see how closely they are following the instructional strokes. Optionally, once the user has finished drawing the letter or other form, the user may observe the user marks without the presence of the instructional strokes. Thus, memory device may further comprise code for removing the instructional stroke from the display screen while the user mark remains. The user may also receive a score based on the amount of time spent drawing within a boundary region.

In a second embodiment of the present invention, an interactive learning apparatus is provided comprising (a) a housing, (b) a processor unit in the housing, (c) a display screen coupled to the processor unit, (e) a position sensing layer associated with the display screen, wherein the position sensing layer comprises a touch panel having discrete touch points, and (f) a memory unit coupled to the processor unit, wherein the memory unit comprises (i) code for displaying an instructional stroke on the display screen, wherein the instructional stroke intersects at least a portion of the touch points, (ii) code for displaying a starting point for drawing the instructional stroke on the display screen, and (iii) code for displaying a user mark on the display screen drawn by a user with the stylus using the starting point as a reference point.

Again, the instructional strokes typically form at least a portion of a letter of an alphabet. However it may be appreciated that the instructional stroke may form other images, such as numbers, symbols, figures, etc. In some embodiments, the instructional stroke is a first instructional stroke, the starting point is a first starting point, and the user mark is a first user mark. In such embodiments, the memory unit may further comprise (iv) code for displaying a second starting point for drawing a second instructional stroke on the display screen and (v) code for displaying a second user mark drawn by the user using the second starting point as a reference point for drawing the second user mark.

In preferred embodiments, the memory unit further comprises code for scoring the accuracy of the drawing of the user mark in relation to the instructional stroke. Scoring may be achieved with the use of the touch points. For example, scoring may comprise determining the amount of touch points intersected by the user mark which are included in the at least a portion of the touch points intersected by the instructional stroke. Alternatively or in addition, scoring may comprise determining the amount of touch points intersected by the user mark which are not included in the at least a portion of the touch points intersected by the instructional stroke. In any case, the user may receive a score that reflects the accuracy of the user mark in following the guide of the instructional stroke. When the apparatus further comprises an audio output device coupled to the processor unit, the memory unit may include code for providing an audio output from the audio output device indicating the accuracy to the user. In some embodiments, scoring may be stored and accumulated. Thus, the user may receive an audio output indicating an accumulated score or accuracy over time.

In some embodiments, the memory unit further comprises code for determining the distance between one of the at least a portion of the touch points and a corresponding point on the user mark. In these embodiments, the memory unit may further comprise code for prompting the user to draw the user mark again or to draw a different user mark depending on the determined distance between the one of the at least a portion of the touch points and the corresponding point on the user mark. And, finally, in some embodiments, the memory unit further comprises code for improving line quality of the user mark.

In a third embodiment of the present invention, an interactive learning apparatus is provided comprising (a) housing, (b) a processor unit in the housing, (c) an audio output device coupled to the processor unit, (d) an erasable display medium coupled to the housing, wherein the erasable display forms a display region, (e) an array of illumination sources in the display region, (f) a memory unit coupled to the processor unit, wherein the memory unit comprises code for illuminating a predetermined number of illumination sources in the array of illumination sources to display an image, and (g) a stylus for drawing on the erasable display to attempt to reproduce the displayed image.

The illumination sources are typically exposed through small holes in the erasable display medium. In preferred embodiments, the erasable display medium comprises a magnetic erasable display medium, and the stylus includes a magnetic tip. Thus, the erasable display medium includes magnetic particles that are attracted to the magnetic tip while the user writes. The magnetic particles remain in their attracted position, creating a user mark on the screen. Typically, the apparatus further comprises an erase lever that can be actuated to erase the erasable display medium.

In addition, methods are provided for using the learning apparatuses. For example, one method includes providing a learning apparatus of the first embodiment, viewing the instructional stroke displayed on the display screen, viewing the starting point associated with the instructional stroke displayed on the display screen, and drawing the user mark on the display screen with the stylus using the starting point as a reference point.

In embodiments where the memory device comprises code for at least one output, the method may further comprise receiving an output regarding the accuracy of drawing the user mark in relation to the instructional stroke. For example, the output may comprise a supportive phrase or a coaching phrase. Or, the method may further comprise receiving an output regarding stroke direction of drawing the user mark in relation to the instructional stroke. Or, the method may further comprise receiving an output regarding completion of drawing the user mark in relation to the instructional stroke.

Another method includes providing a learning apparatus of the second embodiment, viewing the instructional stroke displayed on the display screen, viewing the starting point for drawing the instructional stroke displayed on the display screen, and drawing the user mark on the display screen with the stylus using the starting point as a reference point. When the instructional stroke is a first instructional stroke, the starting point is a first starting point, and the user mark is a first user mark and the memory unit further comprises (iv) code for displaying a second starting point for drawing a second instructional stroke on the display screen and (v) code for displaying a second user mark drawn by the user using the second starting point as a reference point for drawing the second user mark, the method further comprises viewing the starting point for drawing the second instructional stroke displayed on the display screen, and drawing the second user mark on the display screen with the stylus using the starting point as a reference point.

In some embodiments, when the memory unit further comprises code for scoring the accuracy of the drawing of the user mark in relation to the instructional stroke, the method may further comprise receiving an output regarding the accuracy of drawing the user mark in relation to the instructional stroke based on the scoring.

Another method includes providing a learning apparatus of the third embodiment, viewing the illuminated predetermined number of illumination sources, and drawing on the erasable display with the stylus to attempt to reproduce the displayed image. When the erasable display medium comprises a magnetic erasable display medium and the stylus includes a magnetic tip, the method further includes drawing by attracting magnetic particles in the magnetic erasable display medium with the magnetic tip. Typically, the methods further include actuating an erase lever to erase the erasable display medium.

Other objects and advantages of the present invention will become apparent from the detailed description to follow, together with the accompanying drawings.

BRIEF DESCRIPTION OF THE DRAWINGS

FIGS. 8A-8B illustrate views of a position sensing layer embodiment of the interactive learning apparatus of the present invention.

FIGS. 8C-8J illustrate another position sensing layer embodiment of the interactive learning apparatus of the present invention.

FIG. 17 illustrates the user following an instructional stroke with a stylus creating a user mark.

FIG. 18 illustrates a magnetic tip of a stylus.

FIG. 19 illustrates magnetic particles forming a user mark.

DETAILED DESCRIPTION OF THE INVENTION

Three main types of learning apparatuses of the present invention are described herein. These types include Electronic Position Location System Embodiments, Position Sensing Layer Embodiments, and Erasable Magnetic Display Medium with Illumination Embodiments. It may be appreciated that the following detailed description illustrates these types by way of example, not by way of limitation of the principles of the invention.

Electronic Position Location System Embodiments

Figure 1:
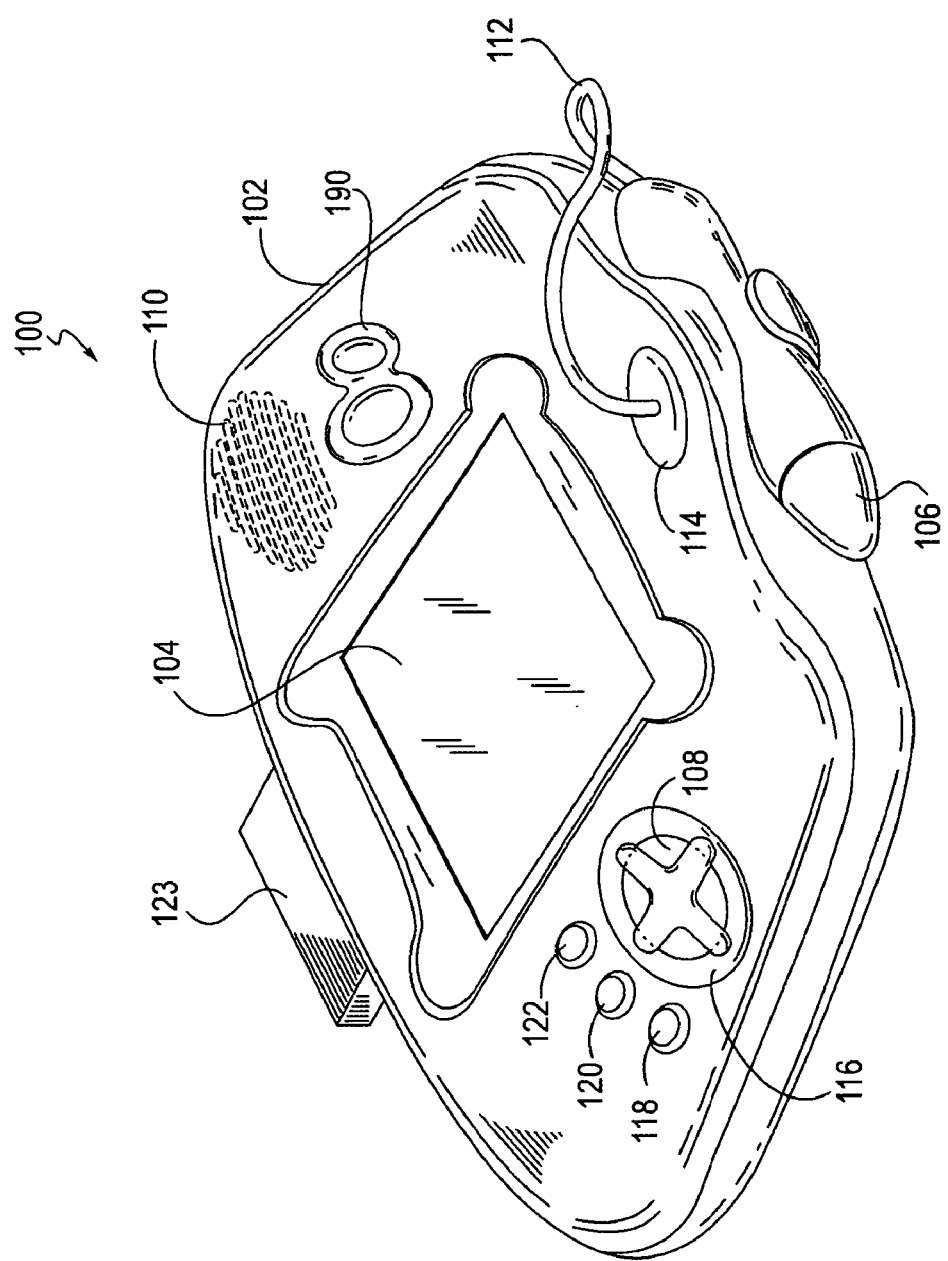
FIG. 1 shows a perspective view of an electronic position location system embodiment of the interactive learning apparatus of the present invention.

FIG. 1 shows a perspective view of an embodiment of the learning apparatus of the present invention in the form of an interactive handheld apparatus. In this embodiment, the interactive handheld apparatus 100 includes: (a) a housing 102; (b) a display screen 104 on the housing 102; (c) an electronic position location system, wherein the electronic position location system includes a processor that is capable of determining a location of a selected region of the display screen 104; (d) a stylus 106 for selecting images on the display screen 104; (e) a directional control pad 108 on the housing 102; and (f) a memory device comprising computer code for an educational exercise or lesson, wherein the memory device is operatively coupled to the processor. An audio output device 110 such as a speaker may also be included and may be coupled to the processor. Exemplary embodiments of some of these features are provided in U.S. Provisional Patent Application No. 60/512,326, filed Oct. 17, 2003, and U.S. patent application Ser. No. 10/775,830, filed Feb. 9, 2004, both incorporated by reference for all purposes and assigned to the assignee of the present invention.

As shown, the housing 102 may be shaped so that it can be held in the hand of a small child. The housing 102 may be made of molded plastic and may be shaped as a trapezoid. Based on the disclosure and teachings provided herein, a person of ordinary skill in the art will appreciate how to utilize various housing shapes for use in accordance with the present invention. A trapezoidal shaped housing is preferred, as it is more ergonomic than, for example, a rectangle shaped housing.

The display screen 104 may comprise any suitable display device. Suitable display devices include, for example, LEDs (light emitting diodes), LCDs (liquid crystal displays), etc. Appropriate driver programs and/or driver chips (e.g., LCD driver chips) can be included in the apparatus 100 to facilitate the function of the display screen 104. For example, in some embodiments, the display screen 104 may comprise an LCD screen having the following specifications including: a square screen size of 2.8", a resolution of 160×160 pixels with a font size of about 7×5 pixels, and base colors based on 12-bit 4-4-4 RGB colors. Backlight for the LCD screen may be generated by using white LEDs with a diffuser. Contrast can be optimized and made adjustable by a user of the apparatus 100 via use of a potentiometer control. In addition, there are two (2) brightness levels or settings for the LCD screen—a low setting optimized for outdoor use and a high setting for internal and low light environment.

In one embodiment, the display screen 104 is used to display images that are rendered using a vector graphics engine, such as, the Macromedia Flash5™ vector graphics rendering engine. Techniques for providing improved vector graphics are described in co-pending, co-owned U.S. Provisional Patent Application No. 60/512,339, entitled "METHOD AND SYSTEM FOR PROVIDING EDGE SMOOTHING," filed on Oct. 17,2003, the disclosure of which is incorporated by reference in its entirety for all purposes.

Images that are formed using vector-graphics processes are preferred over bit-mapped images, which are used in some conventional gaming devices. A vector-graphics based image is stored in a file as a display list that describes in mathematical terms every shape, or object in the image along with its location and properties such as line width and fill (the color pattern that fills a shape). Moving images based on vector-graphics are generally smoother than corresponding bit-mapped images. This is desirable for providing animation that will entertain and engage a child. In some embodiments, the apparatus can play videos for a child (where the child is a passive observer rather than an active game player) in addition to providing interactive educational programs for children. Images formed using vector-graphics processes also take up less memory than bitmapped images so that many games can be stored in a memory device.

Referring again to FIG. 1, the display screen 104 also has touch-screen capability. In one embodiment, the touch-screen capability is adjusted for stylus sensitivity which allows movement of the stylus 106 on the display screen 104 to be detected. To provide for touch-screen capability, a 1K or 2K EEPROM is included in the housing 102 for storing calibration data. Furthermore, the display screen 104 can be made of plastic with an 1.55 mm nominal thickness. Moreover, the LCD screen can float on shock absorbers to protect the screen during impact.

The touch-screen capability is achieved via the electronic position location system. The electronic position location system is capable of determining a location of a selected region of the display screen 104. A commercially available electronic position location system like the ones that are used in many commercially available personal digital assistants may be used. An exemplary system may comprise a glass or plastic plate with a metallic coating facing a metallic coating on an underside of a layer of Mylar™ above the glass or plastic plate. Pressing the screen with the stylus 106 brings the plate and the Mylar™ layer in contact with each other so that an electrical current flows through them. By measuring the electrical current from two sides of the display screen 104, a computer program then determines the vertical and horizontal position of the stylus 106. By sampling contact locations at a predetermined rate, such as, 100 times a second or faster, the display screen 104 can detect the position of the stylus 106. In other examples, there can be a grid of wires under the display screen 104 that can be activated after interaction with the stylus 106. The x-y position can be determined with a processor inside the apparatus 100.

The stylus 106 may or may not comprise an electrical conductor, and may or may not be tethered to the housing 102 via a cord 112. In some embodiments, the stylus 106 includes a light and is made of a translucent or transparent material and may be tethered to the housing 102 via the cord 112. The light in the stylus 106 may be an LED. As will be further described below, the light in the stylus 106 may illuminate or flash during operation of the apparatus 100, such as, when an exercise is being performed, to provide indications that the stylus 106 can be used to perform a particular function. The illuminated or flashing light represents directions that are easy to follow by a user, especially, a child. In other embodiments, a light can also or alternatively be included near or behind the cord exit 114 in the housing 102 or in the cord 112. Similarly, the light may illuminate or flash during operation of the apparatus 100.

A variety of input devices, in addition to the stylus 106, may be used by the user to interact with the apparatus 100. In addition, a directional control pad 108 can be included in the apparatus 100. The pad 108 can be depressed to move a cursor up, down, to the left, to the right or to other predetermined directions. Further, as shown in FIG. 1, a "hint" button 118 may be provided to give the user a hint on how to proceed in an exercise provided by the apparatus 100. Hints can be provided directly to the user upon activation of the "hint" button 18.

A "home" button 120 may be provided to the user back to home state. For example, the "home" button 120 can bring the user back to the beginning of an exercise. Also, a "pause" button 122 may be provided to allow the user to pause operation of the apparatus 100. For example, the "pause" button 122 may be used by the user to pause an exercise in mid-progress.

The apparatus 100 may include a memory device comprising computer code for an educational exercise and/or for storing computer code that relates to the operation of the apparatus 100. Based on the disclosure and teaching provided herein, various educational exercises and/or games can be played using the apparatus 100. The educational programs and other functions described in this application can be programmed by those of ordinary skill in the art using any suitable programming language including C, C++, etc.

The memory device may be any suitable temporary or permanent information storage device. For example, the memory device may include one or more of optical, magnetic, or electronic storage media such as optical or magnetic disks, tapes, sticks, and the like. Storage devices such as these may be used alone or in combination to make up the memory device. Any suitable number of RAM (random access memory), ROM (read only memory) and EPROM (erasable programmable memory) chips may also be included in the memory device. In some embodiments, the ROM can include a memory storage capacity of about 2 MB (megabytes) or more, although the storage capacity is likely to change as data storage technology improves. The memory device may be internal and/or external to the housing of the apparatus 100.

Furthermore, the memory device may be or include a cartridge (e.g., in a flash data cartridge), a disk, a tape, or a memory stick. Cartridges are especially desirable since they can be easily manipulated and handled by children. Any suitable amount of storage space may be provided on the memory device. Preferably, the capacity of the memory device is at least about 1 megabyte (e.g., 4 megabytes or more). Storage capacity can increase as storage technology improves.

In one embodiment, as shown in FIG. 1, a cartridge 123 can be received by an opening in the housing 102. The opening includes appropriate circuitry that allows data from the cartridge to be read. The use of cartridges provides interchangeability.

Any suitable power source may be used. For example, rechargeable or non-rechargeable batteries can be used with the apparatus 100. A battery pack that can use rechargeable batteries that is suitable for use in the apparatus 100 is described in U.S. patent application Ser. No. 10/697,074, filed on Oct. 22, 2003, and 60/506,254, filed on Sep. 26, 2004, which are herein incorporated by reference in their entirety.

Figure 2:
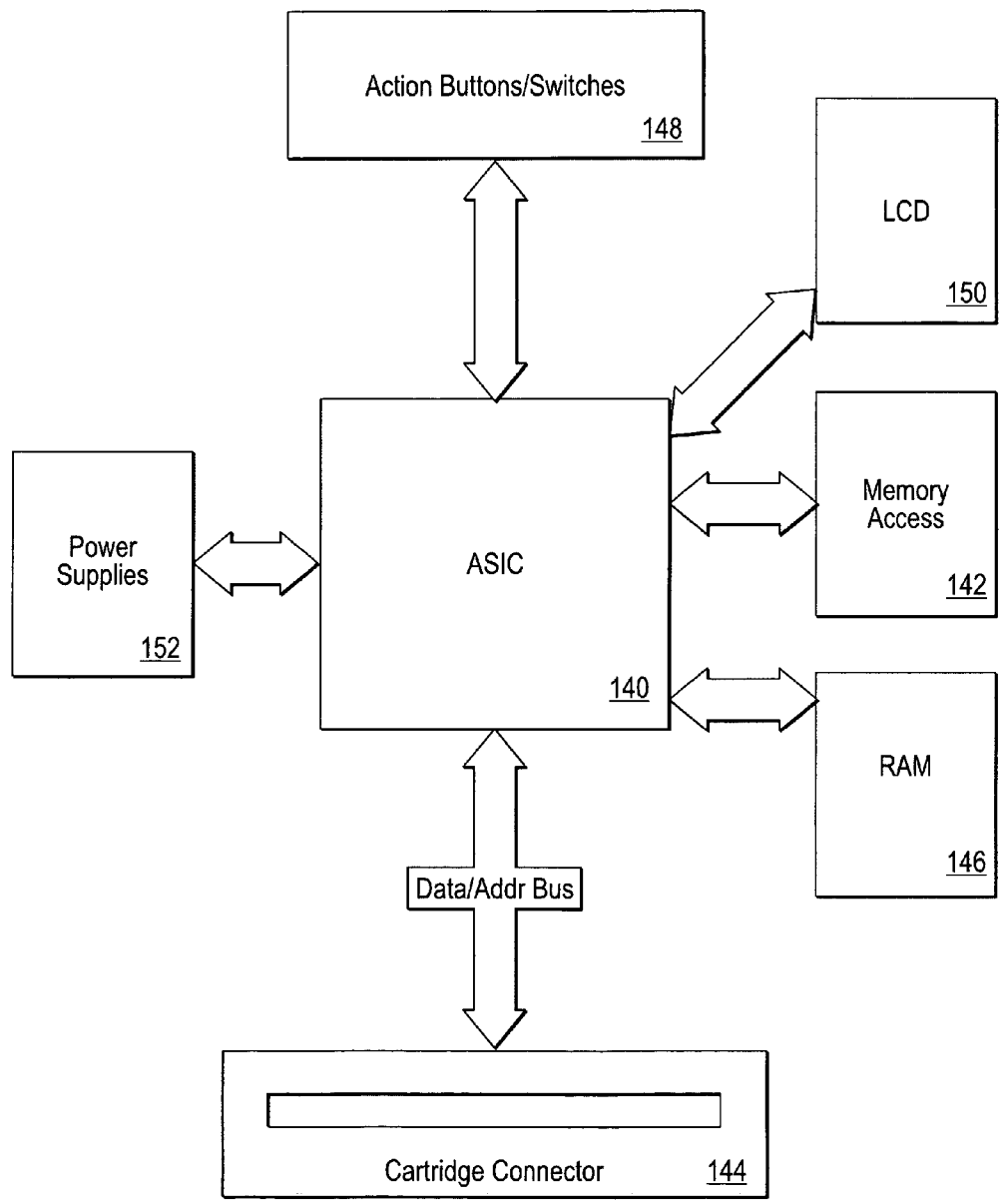
FIG. 2 is a schematic block diagram illustrating various internal components of the apparatus included in one embodiment of the present invention.

FIG. 2 is a schematic block diagram illustrating the various internal components of the apparatus 100 according to one embodiment of the present invention. As shown in FIG. 2, the apparatus 100 includes an application-specific integrated circuit (ASIC) 140. The ASIC 140 further includes a microprocessor and other internal circuitry. The ASIC 140 controls the operations of the apparatus 140 and manages interactions amongst various components including a memory access component 142, a cartridge connector 144, a random access memory component 146, a buttons and switches component 148, an LCD component 150, and power supply circuits 152. Additional schematic block diagrams showing the various components will be provided below.

Figure 3:
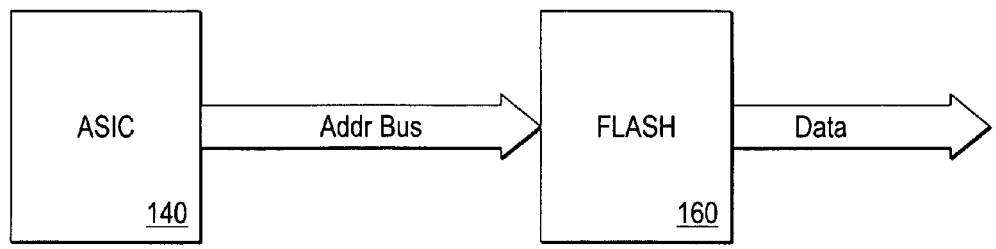
FIG. 3 is a schematic block diagram further illustrating the memory access component included in one embodiment of the present invention.

FIG. 3 is a schematic block diagram further illustrating the memory access component 142 according to one embodiment of the present invention. The memory access 142 further includes a FLASH integrated circuit 160. The FLASH integrated circuit 160 is used to store the boot code for the apparatus 100. The boot code is used to initiate operations of the apparatus 100.

Figure 4:
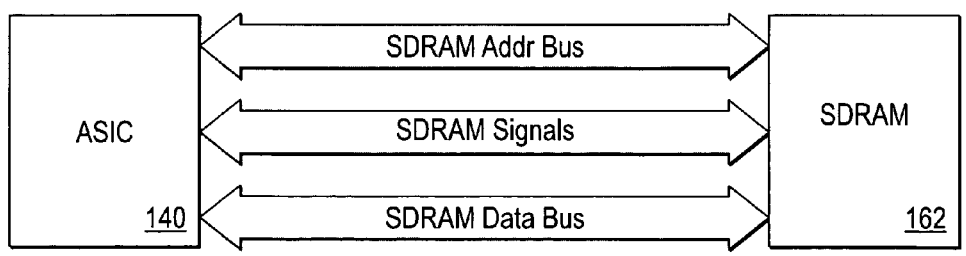
FIG. 4 is a schematic block diagram further illustrated the random access memory component included in one embodiment of the present invention.

FIG. 4 is a schematic block diagram further illustrating the random access memory component 146 according to one embodiment of the present invention. In one embodiment, the random access memory component 146 includes a SDRAM 162. The SDRAM 162 is used to provide temporary storage for executable code during operations of the apparatus 100.

Figure 5:
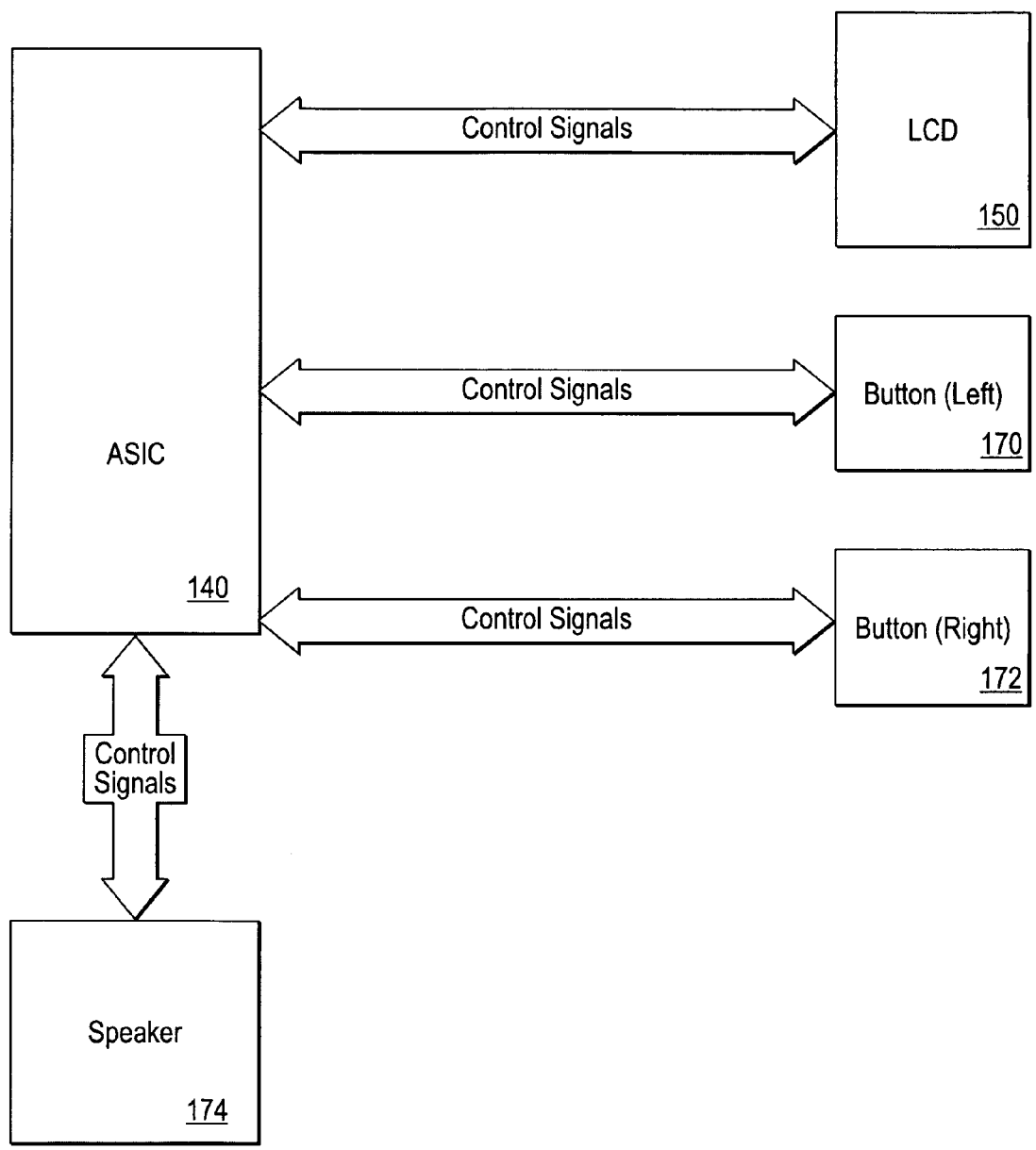
FIG. 5 is a schematic block diagram further illustrating the buttons and switches component and the LCD component included in one embodiment of the present invention.

FIG. 5 is a schematic block diagram further illustrating the buttons and switches component 148 and the LCD component 150 according to one embodiment of the present invention. In one embodiment, two sets of control signals are provided by the ASIC 140 to control two groups of buttons 170 and 172. Circuitry for the two groups of buttons 172 and 170 respectively and schematic block diagrams further illustrating some of the power supply circuits controlled by the ASIC 140 are provided in U.S. patent application Ser. No. 10/775,830, filed Feb. 9, 2004, incorporated by reference for all purposes.

As previously mentioned, embodiments of the interactive handheld apparatus 100 include a memory device comprising computer code for an educational exercise. In preferred embodiments, the educational exercise includes instruction in writing, such as learning how to write letters of an alphabet. FIGS. 6A-6G illustrate steps of an educational exercise regarding writing the letter A. In these figures, the apparatus 100 has been simplified to illustrate the display screen 104, housing 102 and stylus 106 attached thereto by a cord 112. It may be appreciated that the housing 102 has been minimized for clarity of illustration.

The user will typically access the educational exercise by navigating through a series of menu screens. From a "Main Menu", the user may select a "Lessons Menu" and therein select a "Letters & Numbers" submenu. The user may then choose from "Capital Letters", "Lower Case Letters" and "Numbers". For instruction in writing the letter A, "Capital Letters" is selected with the use of the stylus 106. In the lesson, the user is taught how to draw each of the letters of the alphabet, typically by an animated character, such as an animated pencil. The animated pencil will draw each stroke to form the letter on the screen 104 while giving step by step instructions related to each stroke via the audio output. Each lesson with be approximately 5 steps long, however any number of steps may be used depending on the shape of the letter, etc. The user is then instructed to trace or draw on top of the existing stroke marks made by the animated pencil while receiving auditory feedback.

Figure 6A:
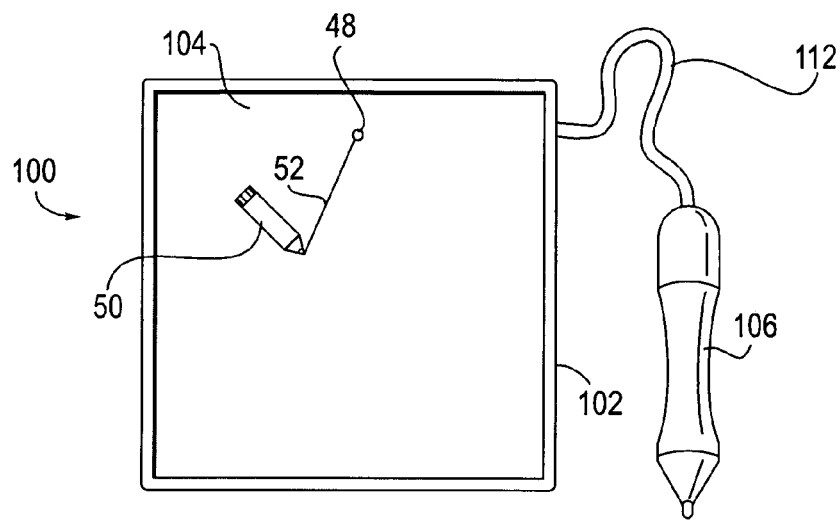
FIGS. 6A-6G illustrate steps of an educational exercise provided by an electronic position location system embodiment.
Figure 6B:
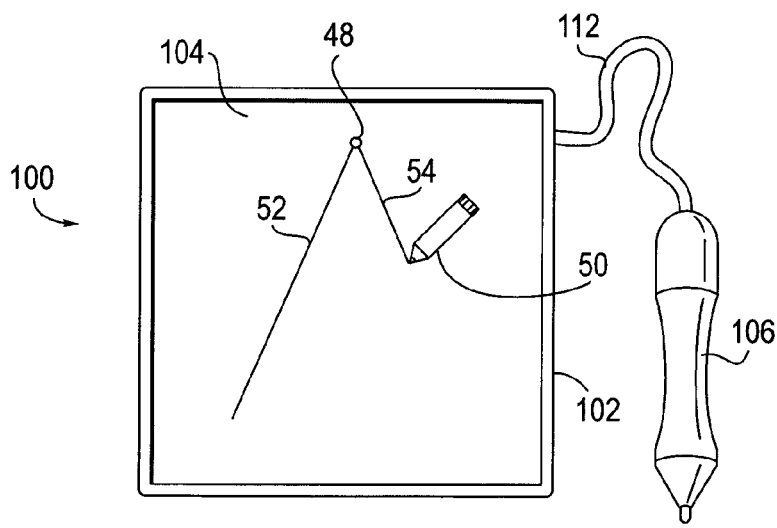
Figure 6C:
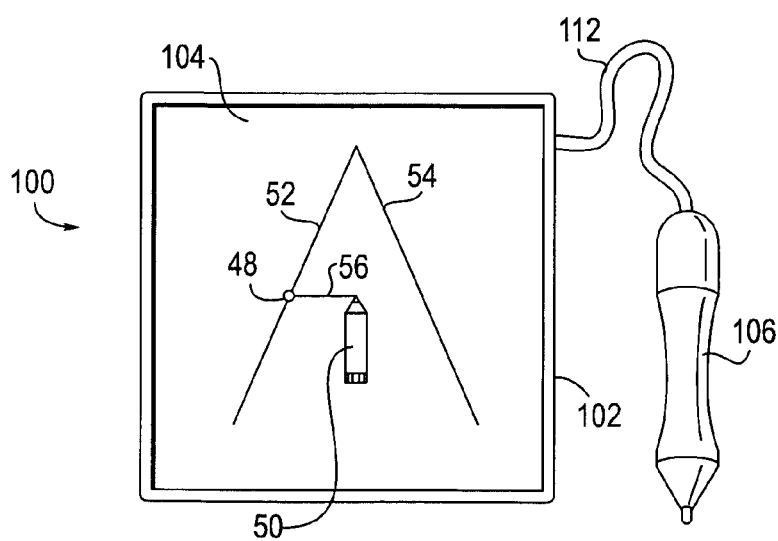

For example, FIG. 6A illustrates the appearance of a start marker 48, in the form of a flashing dot, on the screen 104 and an animated pencil 50 drawing a first instructional stroke 52, wherein the first instructional stroke 52 starts at the start marker 48 and continues in a slanted direction to form a left side of the letter A. FIG. 6B illustrates the animated pencil 50 drawing a second instructional stroke 54, wherein the second instructional stroke 54 starts at the start marker 48 and continues in a slanted direction to form a right side of the letter A. FIG. 6C illustrates the appearance of the start marker 48 at a new location on the screen 104, the animated pencil 50 drawing a third instructional stroke 56 wherein the third instructional stroke 56 starts at the start marker 48 and continues in a horizontal direction to form a crossbar of the letter A. It may be appreciated that the first, second and third instructional strokes 52, 54, 56 may be drawn on the screen 104 without the presence of an animated character, may initially appear as complete lines rather than mimicking the drawing of each line, or may initially appear together to show the entirely formed letter. Further, it may be appreciated that the instructional strokes 52, 54, 56 may have any line thickness, quality (such as dashed or dotted) or color (such as grey).

Figure 6D:
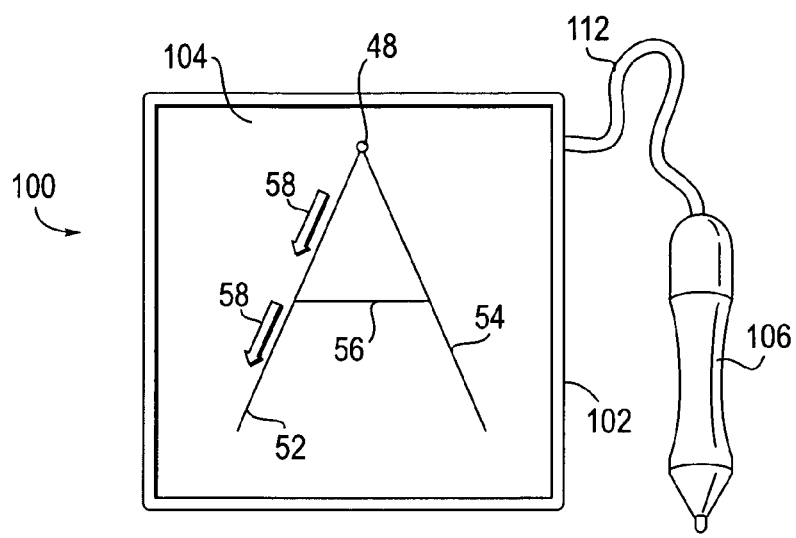
Figure 6E:
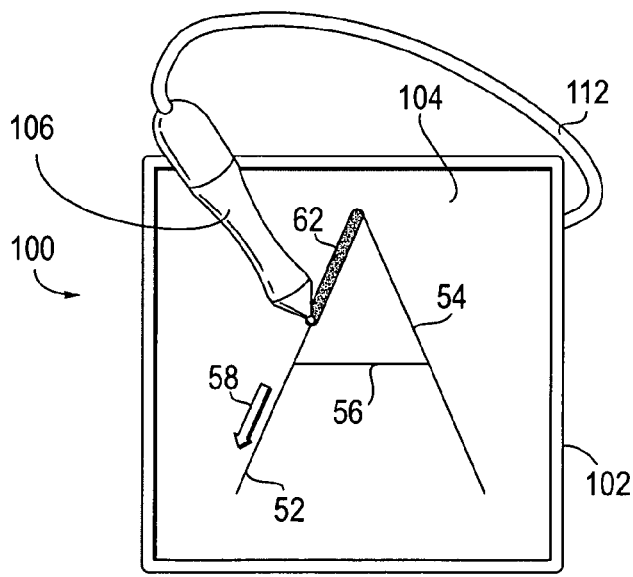
Figure 6F:
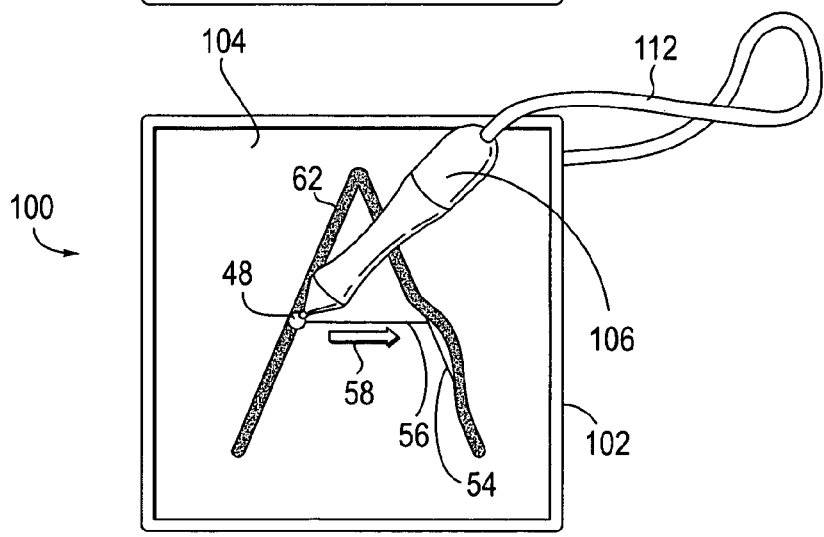
Figure 6G:
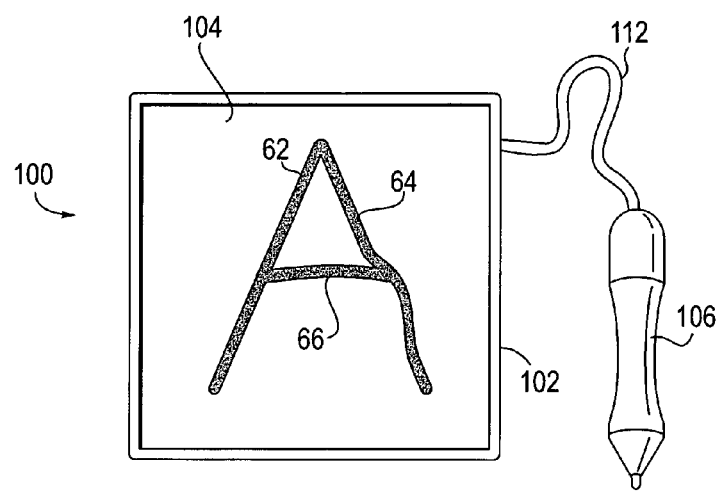

Once the instructional strokes 52, 54, 56 have been drawn by the animated pencil, the user is prompted to trace the strokes 52, 54, 56. Typically, as shown in FIG. 6D, the letter, in this case the letter A, is shown in its entirety and the user is provided with a start marker 48 and stroke direction arrows 58 for guidance. The user then traces the instructional strokes 52, 54, 56 with the stylus 106, as shown in FIGS. 6E-6F. Referring to FIG. 6E, as the stylus 106 traces the first instructional stroke 52, a first user mark 62 is drawn on top of the first instructional stroke 52. The user mark may have any line thickness, quality or color and typically differs from the instructional stroke so that it may be visually differentiated. FIG. 6F illustrates a second user mark 64 drawn on top of the second instructional stroke 54 wherein the second user mark 64 slightly mistraces the second instructional stroke 54 leaving portions of the second instructional stroke 54 visible. This allows the user to visibly judge their tracing and letter writing ability. Once the user has completed the tracing steps, the instructional strokes 52, 54, 56 may be removed and the user marks 62, 64, 66 remain, as illustrated in FIG. 6G. This also allows the user to visibly judge their letter writing ability and to visualize their letter without the instructional strokes.

Throughout the lesson, the user may receive feedback, typically auditory feedback via the audio output device 110. For example, the animated pencil 50 may comment on stroke accuracy, stroke direction, or completion of line. For example, if the user is successfully tracing the instructional stroke, the user may hear a supportive phrase such as "That was great!", "Good job!", "Wow!", or "Terrific!", to name a few. If the user begins to draw a user mark which strays from the instructional stroke, the user may hear a coaching phrase such as "Uh Oh! Try Again!", "Whoops!", or "Let's see if you can get a little closer to mine", to name a few.

Figure 7A:
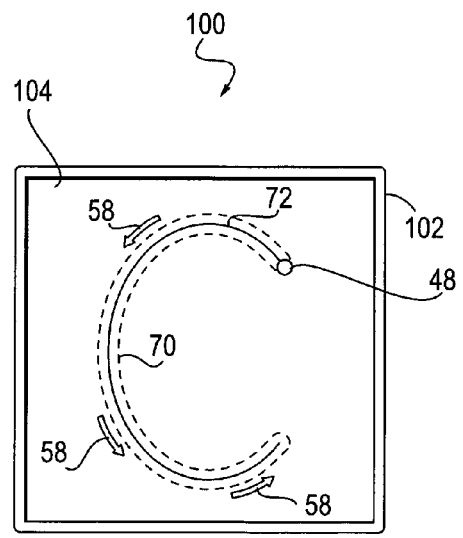
FIGS. 7A-7B illustrate the use of boundary regions surrounding instructional strokes.
Figure 7B:
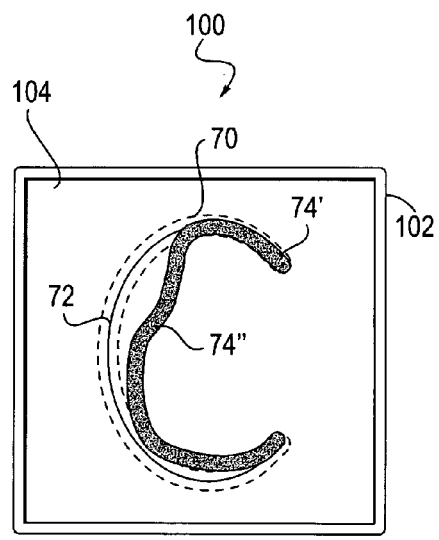

Minimal straying from the instructional stroke may be permissible, however once the user mark strays outside of a boundary region 70, as illustrated in FIGS. 7A-7B, the user may receive feedback to assist the user to improve accuracy. FIG. 7A illustrates the letter C, formed from an instructional stroke 72, on the display screen 104. The instructional stroke 72 includes a starter marker 48 and stroke direction arrows 58. In addition, a boundary region 70 is shown surrounding the instructional stroke 72. Referring to FIG. 7B, when the user draws a portion of the user mark 74' within the boundary region 70, the user hears a supportive phrase, and when the user draws another portion of the user mark 74" outside of the boundary region 70, the user hears a coaching phrase. The boundary region 70 is not visible to the user on the display screen 104. Rather, the boundary region 70 simply delineates specific areas or x-y locations on the display screen 104 that provide different audio outputs when contacted with the stylus 106. This can be achieved by a computer program or processor. It may also be appreciated that feedback other than supportive or coaching phrases may be provided, such as other audio and/or visual feedback. Or, if the user draws substantially outside of the boundary region 70, such as drawing a horizontal line rather than a C shape, the user mark may be automatically erased and the user asked to try again. If the user does not provide a user mark that is within the boundary region 70 after a predetermined number of attempts, such as two attempts, the user may again be provided with the instructional stroke 72 on the display screen 104 to refresh the user's memory of how to draw the letter. This advantageously causes the user to repeat strokes that the user may not have mastered.

The animated pencil 50 may also comment on stroke direction and/or completion of line. For example, if the user traces an instructional stroke in a wrong direction, the a corrective phrase such as "Oops, you went the wrong way!", "Try going in the same direction I did!", "That was backwards!", or "Nice one but start at the red dot next time!", to name a few. If the user begins to draw a user mark but does not follow the instructional stroke to its end, the user may hear a coaching phrase such as "Oops! You didn't quite finish the line!", "Try drawing the WHOLE line!", or "Hey that line looks a little short!", to name a few. The apparatus 100 is able to determine the direction of the user marks and the completion of lines by determining the x-y location of the stylus 106 at any time and correlating this information with the use of a computer program or processor.

Alternatively, the user may receive other forms of feedback throughout the lesson. For example, if the user mark strays outside of a boundary region 70 the user mark may be erased, deleted or disappear from the display screen 104. This type of visual feedback alerts the user that the user mark was incorrect or did not sufficiently trace the instructional stroke. Other types of feedback may also be presented to the user throughout the lesson.

Embodiments of the invention provide for a number of advantages. As noted above, the user can receive both audio and visual feedback on how s/he can write letters. The visual feedback allows a user to see how much more that user needs to improve in his or her writing.

Figure 7C:
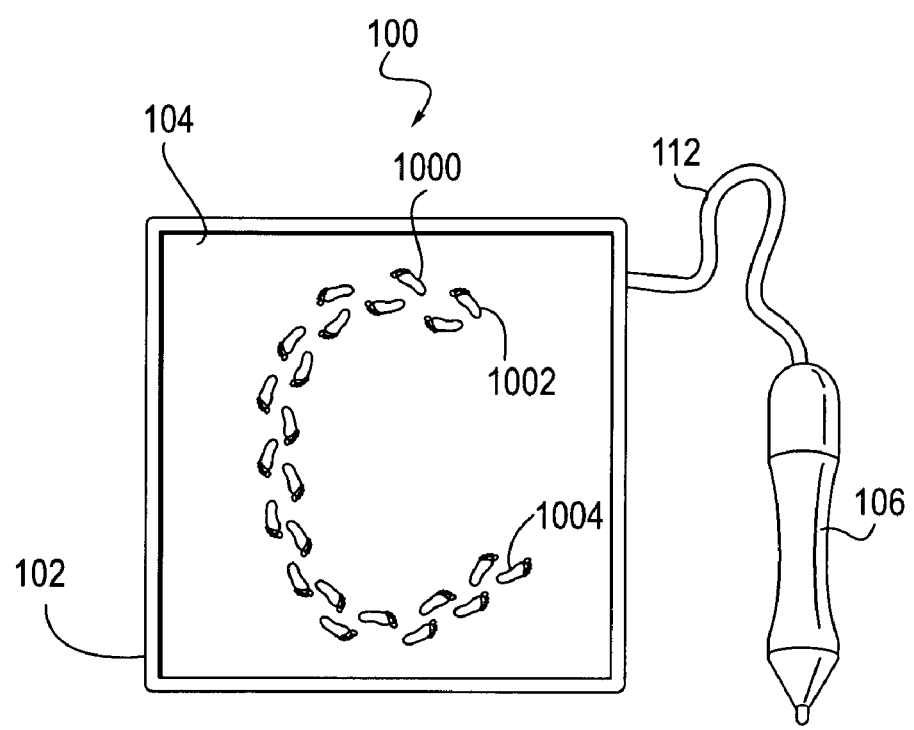
FIG. 7C illustrates instructional strokes in the form of a non-line.

In the embodiments that are described above (and below), instead of solid lines, the instructional strokes may alternatively be in other forms such as dashed lines, dots, etc. In some embodiments, the instructional strokes relate to a particular "theme" of a particular piece of software. This encourages children to write in a fun environment and encourages learning. For example, as shown in FIG. 7C, instructional strokes may be in the form of footprints 1000, and these footprints 1000 can be used to form letters, numbers, and shapes, to name a few. In an illustrative embodiment, the software theme may relate to Cinderella and a Prince. The screen 104 shows footprints 1000 being drawn on the screen instead of the solid lines of the instructional strokes shown in FIGS. 6A-6D. The instructional stroke may include a green footprint 1002 at the start point of a stroke and a red footprint 1004 at an end point of the stroke. Thus, the user may be instructed to "Start at the green footprints, and then make a line to the read footprints." As the user traces over the footprints 1000, they light up. Once a letter or shape is completely formed, it is lit up and identified by name (e.g., "You've drawn, the letter C"). Of course, other themes can be provided instead of a Cinderella theme. For example, there can be a dinosaur theme with dinosaur tracks being instructional strokes, there can be a train theme with train cars representing the instructional strokes, etc. Thus, in embodiments of the invention, images of non-line, ordinary objects (e.g., cars, trains, boats, footprints, etc.) that correspond to theme unrelated to writing can be used as instructional strokes to teach a child how to write. Unlike traditional writing software, the instructional marks showing a child how to write can be put in an environment that is fun and is not strictly "learning". This encourages learning.

Position Sensing Layer Embodiments

FIG. 8A shows a perspective view of an embodiment of the present invention in the form of an interactive learning apparatus 160. The interactive learning apparatus 160 teaches the user the basics of writing letters of an alphabet by showing the user the stroke order of each letter on screen 162, such as an LCD (liquid crystal display) screen. A touch panel 164 (substantially transparent) is positioned on top of the LCD screen wherein the touch panel 164 includes a touch point matrix, such as a 48×54 grid of touch points. The letter (in this example, letter A) is positioned such that individual strokes of the letter coincide with touch points of the touch point matrix. The user then makes the stroke marks of the letter on the touch panel 164 with the stylus 170. As the user makes the stroke marks, a segment on the screen appears mimicking the appearance of drawing a line on the screen. In addition, individual touch points are activated by the stylus 170. The touch points are used to grade or score the accuracy of the letter formation. The more touch points that coincide with the letter are activated, the higher the accuracy of the letter form and thus the higher the score. If touch points are activated that do not coincide with the letter, the user had less accuracy in following the letter form and the score is lowered.

The apparatus 160 includes a housing 172 which may have any suitable shape but preferably generally rectangular with a carrying handle 182 on top. The apparatus 160 is typically sized to be portable and allow play on a user's lap or on a table top. Surfaces of the housing 172 are available on either side of the screen 162 for the user to rest their hand when writing, accommodating a left-handed or right-handed user. The display screen 162 may be comprised of an LCD screen, while the position sensing layer may include one or more sublayers that provide position sensing capability. Such position sensing ability is provided in many touchscreen/LCD combinations that are known in the art (e.g., U.S. Pat. No. 5,633,660 and commercially available handheld computers such as Palm Pilot™). The screen may have any suitable size, such as a width of 2.25 inches and a height of 2 inches and the touch panel 164 covering the screen may have the same size. Screen resolution may be 32×28 pixels. The stylus 170 is positioned in the base/center of the apparatus 160 and connected to the housing 172 by a cord 174. In addition, the apparatus 160 includes a keypad 176 comprised of a variety of buttons 178, wherein each button 178 represents a letter of an alphabet. Each button 178 is activated by touch. To choose a letter to practice writing, user presses the button 178 corresponding to the letter of choice. The user may select the uppercase or lowercase version of the letter by manipulating a case selector 186. FIG. 8B provides a side perspective view of the embodiment of FIG. 8A.

Figure 8D:
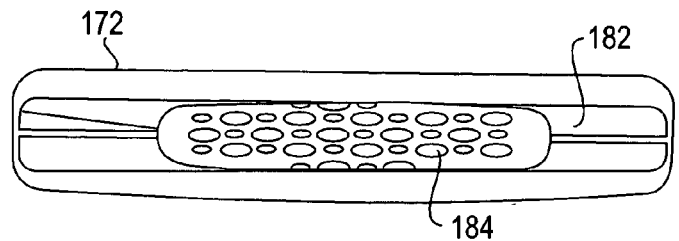
Figure 8C:
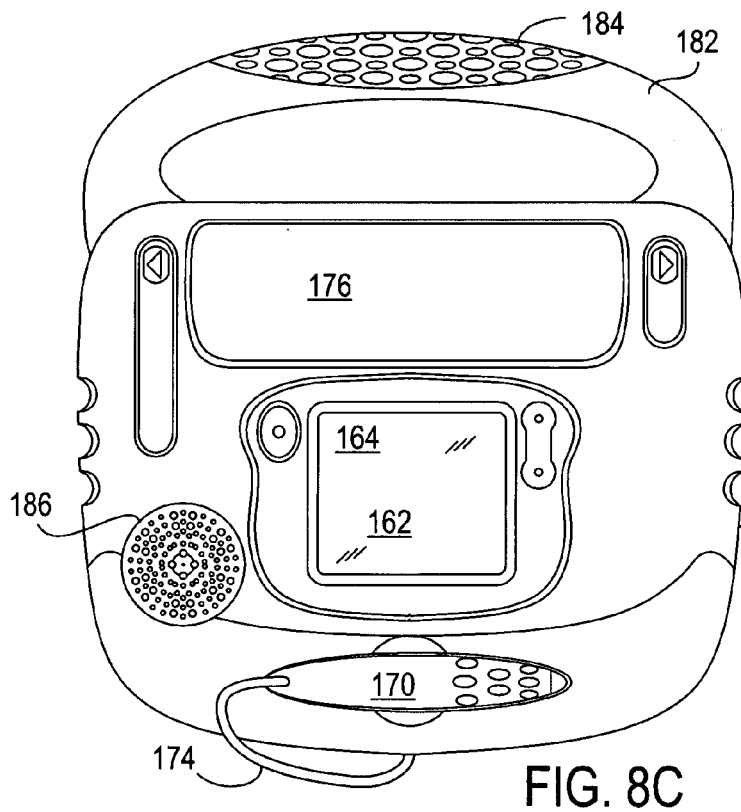
Figure 8F:
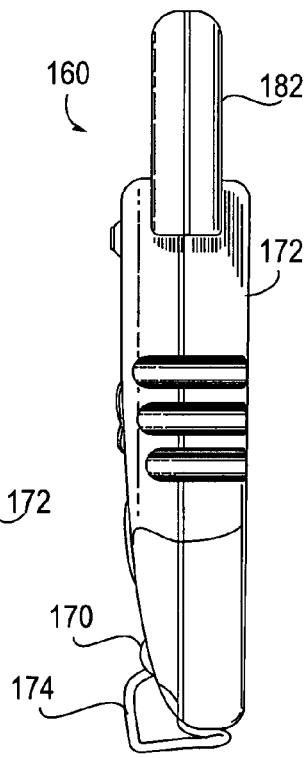
Figure 8E:
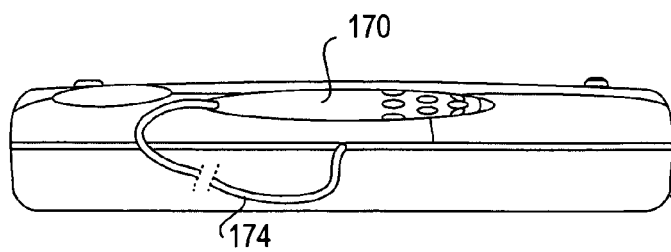
Figure 8G:
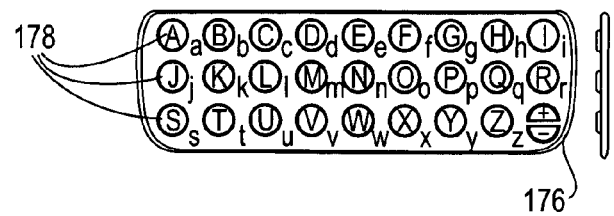

FIGS. 8C-8J illustrate a similar embodiment of the apparatus 160. FIG. 8C provides a front view of the housing 172 having a carrying handle 182, wherein the carrying handle 182 includes a textured portion 184 to improve gripping. The apparatus 160 includes a display screen 162 having a touch panel 164 positioned over the screen 162. The apparatus 160 further includes a keypad 176 and a stylus 170 positioned in the base/center of the apparatus 160 which is connected to the housing 172 by a cord 174. In addition, a speaker 186 is illustrated which provides audio output from an audio output device. FIG. 8D provides a top view of the housing 172 showing the textured portion 184 of the handle 182. FIG. 8E provides a bottom view of the housing 172 showing the stylus 170 positioned in the base/center of the apparatus 160 connected to the housing by a cord 174. FIG. 8F provides a right side view of the housing 172. And, FIG. 8G provides an illustration of an embodiment of the keypad 176 having a variety of buttons 178, wherein each button 178 represents a letter of an alphabet. FIG. 8H provides a back view of the housing 172 and FIG. 8I provides a left side view of the housing 172. FIG. 8J illustrates an embodiment of a stylus 170 of the present invention connected with a cord 174.

Additional exemplary embodiments of some of these features are provided in U.S. Provisional Patent Application No. 60/510,809, filed Oct. 10, 2003, incorporated by reference for all purposes and assigned to the assignee of the present invention.

Figure 9:
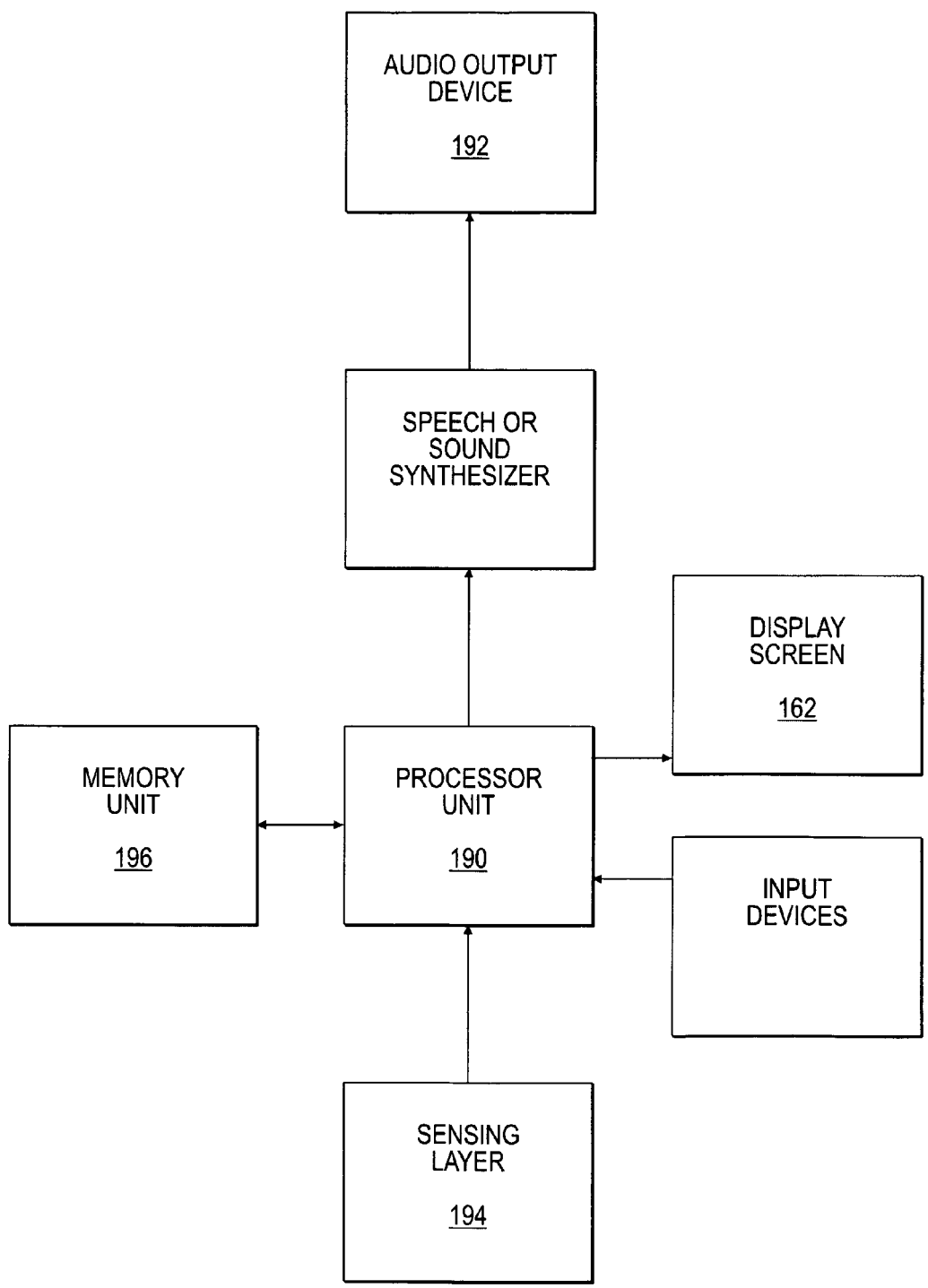
FIG. 9 is a schematic block diagram illustrating various internal components of the apparatus included in one position sensing layer embodiment of the present invention.

In preferred embodiments, as illustrated in FIGS. 8A-8J and in FIG. 9, the interactive learning apparatus 160 includes: (a) a housing 172, (b) a processor unit 190 in the housing 172, (c) an audio output device 192 coupled to the processor unit 190, (d) a display screen 162 coupled to the processor unit 190 (e) a position sensing layer 194 (or touch panel) associated with the display screen 162, and (f) a memory unit 196 coupled to the processor unit 190, wherein the memory unit 196 comprises (i) code for displaying an image on the display screen 162, (ii) code for displaying a starting point for drawing at least a portion of the image on the display screen 162, and (iii) code for displaying a mark drawn by a user using the starting point as a reference point.

Figure 10A:
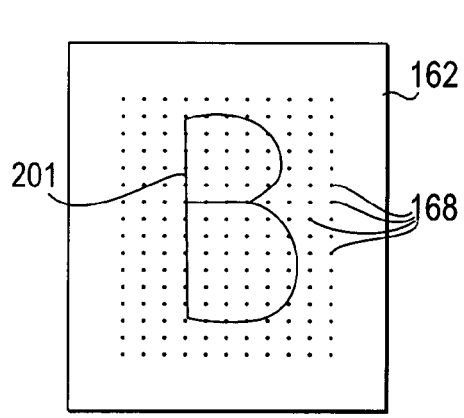
FIGS. 10A-10F illustrate an embodiment of an educational exercise provided by a position sensing layer embodiment.
Figure 10B:
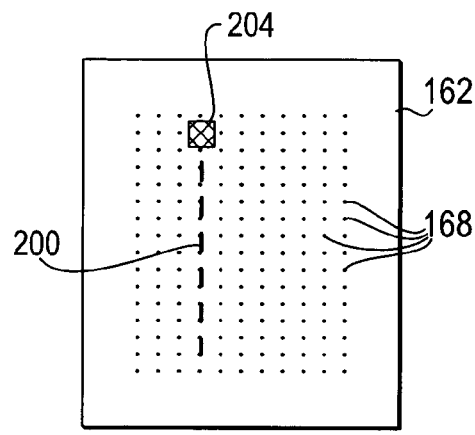
Figure 10C:
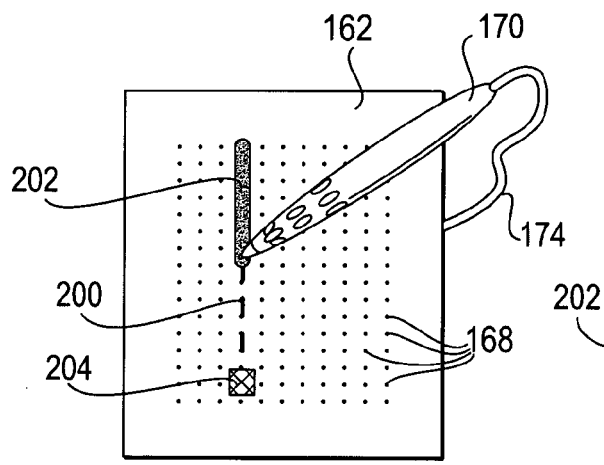

As described, the interactive learning apparatus 160 teaches the user the basics of writing letters of an alphabet by showing the user the stroke order of each letter on the screen 162 and allowing the user to make the stroke marks of the letter on the touch panel 164 with the stylus 170. FIGS. 10A-10B illustrate an embodiment of this exercise. FIG. 10A illustrates a screen 162 overlayed with a touch panel comprised of touch points 168. An image 201, in this example the letter B, is displayed on the screen and the user may hear an audio output such as "Letter B says B and buh! Here is the letter B!". The letter B may simply appear in its entirety on the screen or the stroke marks may appear to form the letter B. Referring to FIG. 10B, the letter B then vanishes and a dashed line 200 appears representing a first stroke to draw the letter B. In addition, a reference marker 204 (such as a blinking square) appears as a starting point to indicate to the user where to begin drawing the first stroke. The user may then hear instructional audio output such as "Draw a big line straight down starting at the blinking dot". FIG. 10C illustrates drawing a first user mark 202 along the dashed line 200 with the stylus 170. As the user draws the first user mark 202, the stylus 170 passes over a portion of the touch points 168. If the user correctly follows the dashed line 200, the correct touch points 168 (or grading points) will be touched with the stylus 170. The correct touch points will be tallied and used in the grading process. The reference marker 204 may then appear at the end of the dashed line 200, as shown, to indicate the ending point for drawing the stroke mark. It may be appreciated that the reference marker 204 may "move around" to indicate different starting and ending points, or multiple reference markers 204 may be used wherein some indicate starting points and some indicating ending points. The user may also hear an audio output such as "Finish your line at the bottom. See the blinking dot".

Figure 10D:
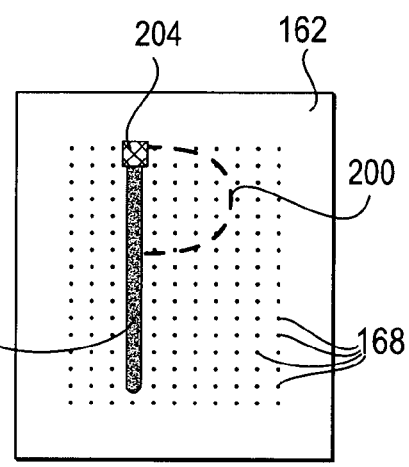
Figure 10E:
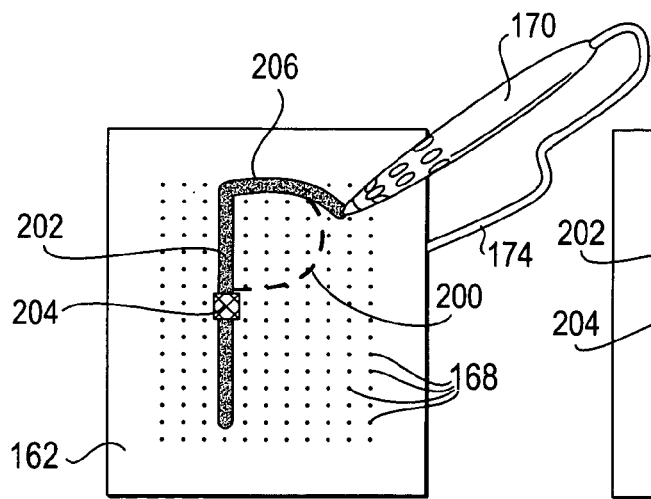
Figure 10F:
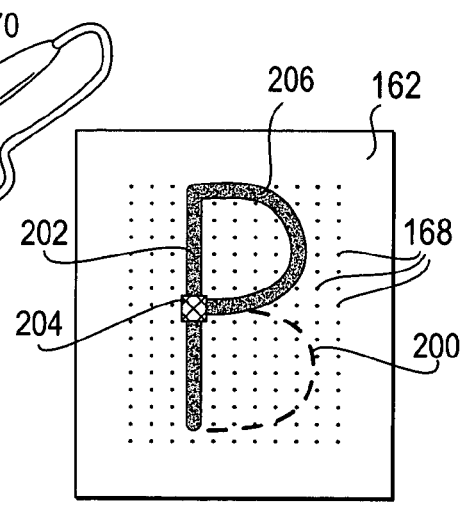

FIG. 10D shows the first user mark 202 drawn and a dashed line 200 representing a second stroke to draw the letter B. In addition, a reference marker 204 is shown to indicate to the user where to begin drawing the second stroke. The user may hear an audio output such as "Good job, now for the next part. Leapfrog back to the starting point." FIG. 10E illustrates drawing a second user mark 206 along the dashed line 200 with the stylus 170. The reference marker 204 may then appear at the end of the dashed line 200, as shown, to indicate the ending point for drawing the stroke mark. The user may hear an audio output such as "Make a curve around to the blinking dot." As the user draws the second user mark 206, the stylus 170 passes over a portion of the touch points 168. Here, the user is not correctly following the dashed line 200 and incorrect touch points are touched with the stylus 170. The incorrect touch points will be tallied and used in the grading process. FIG. 10F shows the first user mark 202 and second user mark 206 drawn and a dashed line 200 representing a third stroke to draw the letter B. In addition, a reference marker 204 is shown to indicate to the user where to begin drawing the third stroke. The user may hear an audio output such as "Now curve around again to the bottom to finish the B!". The reference marker 204 may then appear at the bottom of the B and the user may create a third user mark over the dashed line 200. It may be appreciated that songs, poems or other audio outputs may be used to coach or provide instruction to the user.

As mentioned, the touch points 168 are used to grade or score the accuracy of the user in drawing the letter. For example, the number of correct touch points and incorrect touch points that were touched by the stylus 170 may be tallied and used to generate a score. Typically, the higher the score the more accurately the user drew the letter. The user may also be scored on individual portions of the image. For example, if the user scored better on the curved portions than the straight portion, the user may hear an audio output such as "Good practice! Great curve! Let's try again!". A variety of other audio outputs may also be heard indicating the accuracy to the user.

Figure 11A:
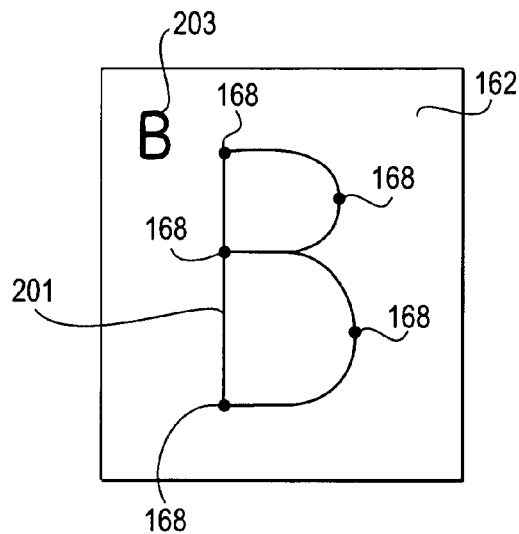
FIGS. 11A-11D illustrate another embodiment of an educational exercise provided by a position sensing layer embodiment.
Figure 11B:
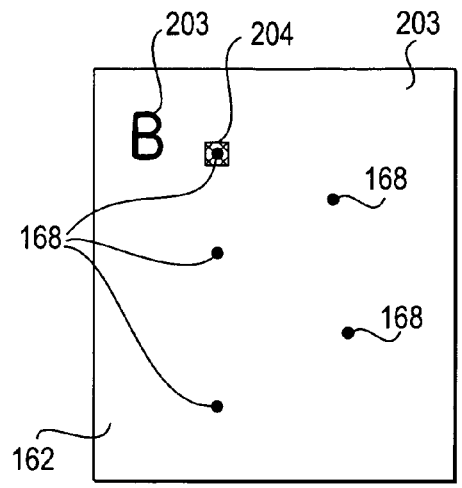

FIGS. 11A-11D illustrate an embodiment of another letter writing exercise. FIG. 11A illustrates a screen 162 overlayed with a touch panel comprised of five touch points 168. An image 201, in this example the letter B, is displayed on the screen 162 coincident with the touch points 168 and the user may hear an audio output such as "Letter B says B and buh! Here is the letter B!". The letter B may simply appear in its entirety on the screen or the stroke marks may appear to form the letter B. In addition, a reference image 203 is shown in a corner of the screen 162. Referring to FIG. 11B, the image 201 then vanishes while the reference image 203 remains. Alternatively, the reference image 203 may also vanish and then reappear by redrawing itself. In this case, the user may hear an audio output such as "Watch the letter as it is drawn, then draw your own."

Figure 11C:
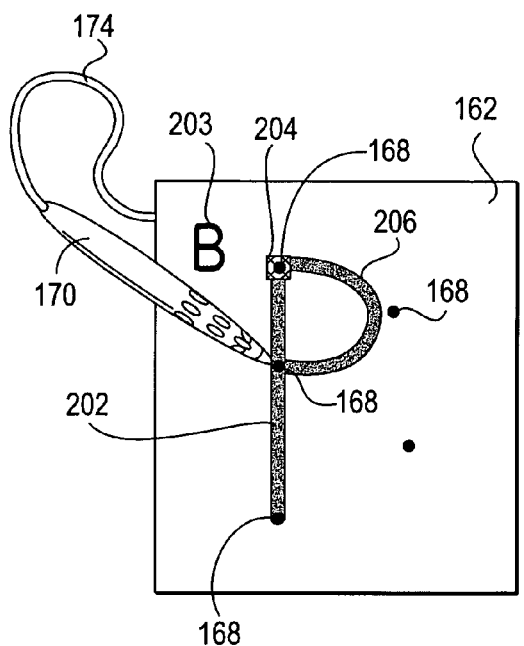
Figure 11D:
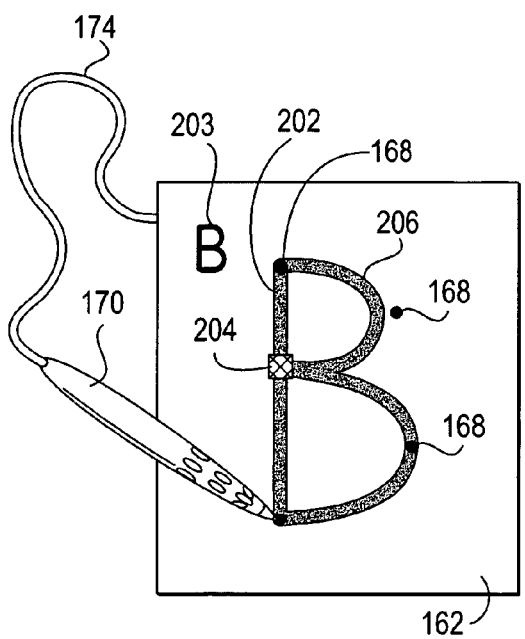

A reference marker 204 (such as a blinking square) appears as a starting point to indicate to the user where to begin drawing the first stroke. The user may then hear instructional audio output such as "Draw a big line straight down starting at the blinking dot". FIG. 11C illustrates drawing a first user mark 202 and second user mark 206 with the stylus 170. As shown, as the user draws the first user mark 202, the stylus 170 passes over the three touch points 168 aligned with the first user mark 202. However, as the user draws the second user mark 206, the user misses a touch point 168. FIG. 11D shows the user drawing a third user mark 208 passing over the last of the five touch points 168. Since the user only touched 4 out of the five touch points 168, the user will receive a reduced score.

In some embodiments, the user marks will be enhanced by a technique known as Gracious Writing. Gracious Writing improves line quality of user marks when the touch panel 164/screen 162 does not have enough granularity for optimal implementation. In these instances, the user marks may have a jagged appearance even if the user made smooth lines. Each user mark is made up of pixels on the screen. In addition, the correct path for drawing the stroke marks on the screen is mapped out by the "correct" touch points 168. As the user marks are drawn, the pixels of the user mark "lean" toward the correct path as indicated by the correct touch points 168. Leaning of the pixels is achieved by software associated with the touch points 168. Thus, the Gracious Writing feature leaves the user with a better feeling without actually changing the user's input.

Another letter writing exercise is actuated by selecting a Write Letter mode. The user then hears an audio output such as "Let's write! Press a letter or a number!" The user may then select a letter by pressing a button 178 on the keypad 176. If an uppercase switch is on, then the letter will be uppercase. If a lowercase switch is on, the letter will be lowercase. The user may then hear an audio output such as "Letter A says A and ah, as in apple! Here's how you write the (uppercase/lowercase) letter A!". An image of the letter is then shown on the screen 162, typically animated to show the individual stroke marks. Music may be hear while the image is appearing on the screen 162; optionally the music may go up a scale as the stroke marks go up and go down a scale as the stroke marks go down. The user may the hear an audio output such as "Now it's your turn! Draw along with me!". The image may then flash on the screen 162 and then vanish. The user may then draw user marks on the screen to recreate the image/draw the letter A. After a time delay, the user may hear an audio output such as "That's the letter A! Great job! Time to erase!". Alternatively, the drawn user marks may morph into the image of the letter, and optionally the letter may animate, such as dance around. The user may then be prompted to select another letter from the keypad 176.

Erasable Magnetic Display Medium with Illumination Embodiments

Figure 12A:
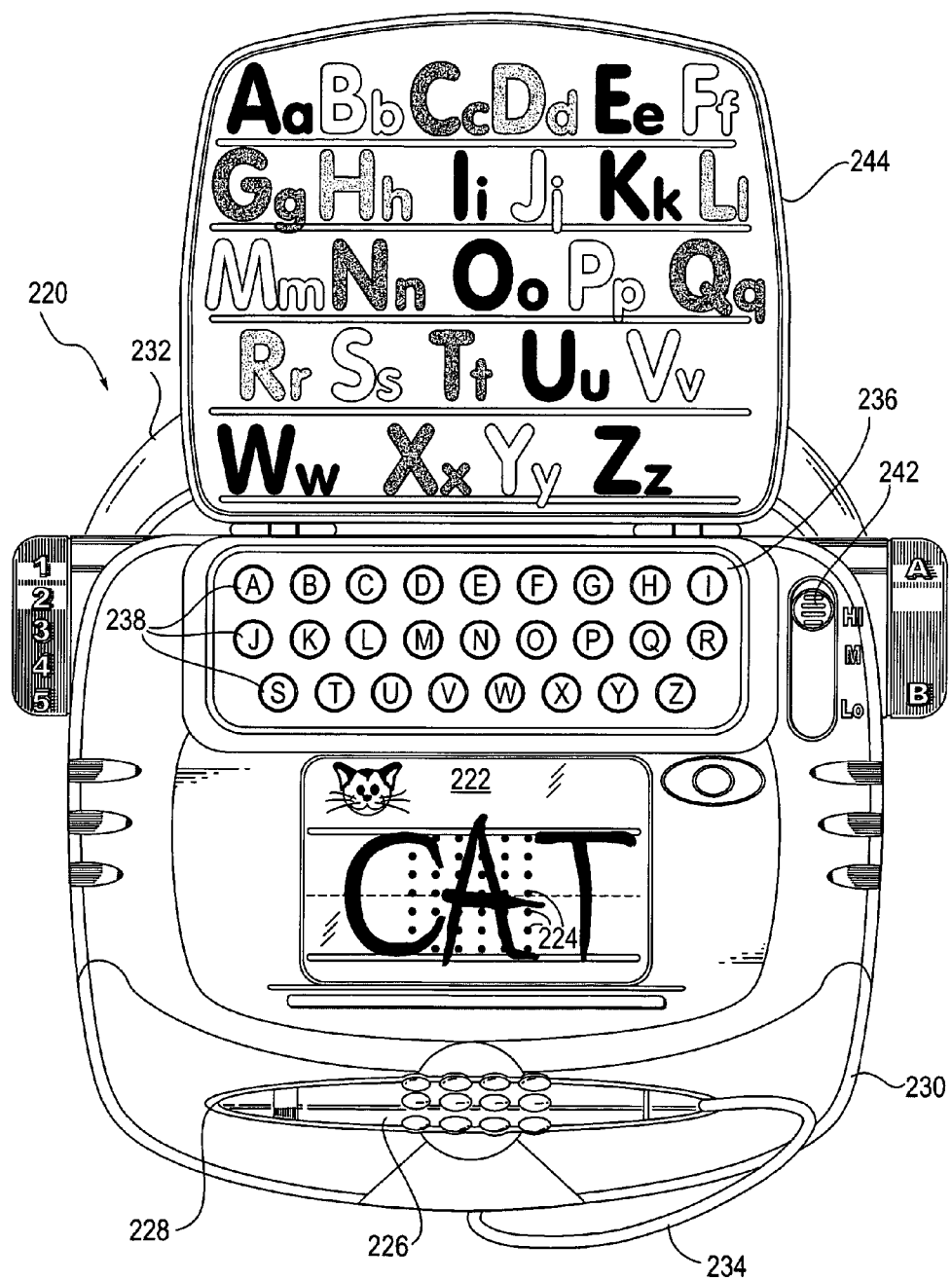
FIGS. 12A-12B illustrates a perspective view an erasable magnetic display medium with illumination embodiment of the interactive learning apparatus of the present invention.

FIG. 12A shows a perspective view of an embodiment of the present invention in the form of an interactive learning apparatus 220 having an erasable magnetic display medium with illumination. The interactive learning apparatus 220 teaches the user the basics of writing letters of an alphabet by showing the user the stroke order of each letter on an erasable display 222, such as a magnetic drawing board, with the use of illumination. The display 222 is positioned on top of a matrix of illumination sources 224, such as LEDs. Small holes in the display 222 allow light from the illumination sources 224 to shine through the display 222. The stroke marks used to create the letter (in this example, letter A) are animated by the illumination sources 224. The user is then able to draw directly over the holes with a stylus 226 while following the animated illumination sources 224 making the stroke marks of the letter on the display 222. The stylus 226 has a magnetic tip 228 so that as the user makes the stroke marks, magnetic material within the display 222 is drawn toward the magnetic tip 228 and remains in place mimicking the appearance of drawing a line on the display 222.

The apparatus 220 includes a housing 230 which may have any suitable shape but preferably generally rectangular with a carrying handle 232 on top. The apparatus 160 is typically sized to be portable and allow play on a user's lap or on a table top. Surfaces of the housing 230 are available on either side of the erasable display 222 for the user to rest their hand when writing, accommodating a left-handed or right-handed user. The display 222 may have any suitable size, such as a width of 3 inches and a height of 1.5-2 inches and the matrix of illumination sources 224 may be 5×7 (5 across by 7 high). Generally, the matrix of illumination sources 224 form upper and lower case letters no more than 1 inch high.

Figure 12B:
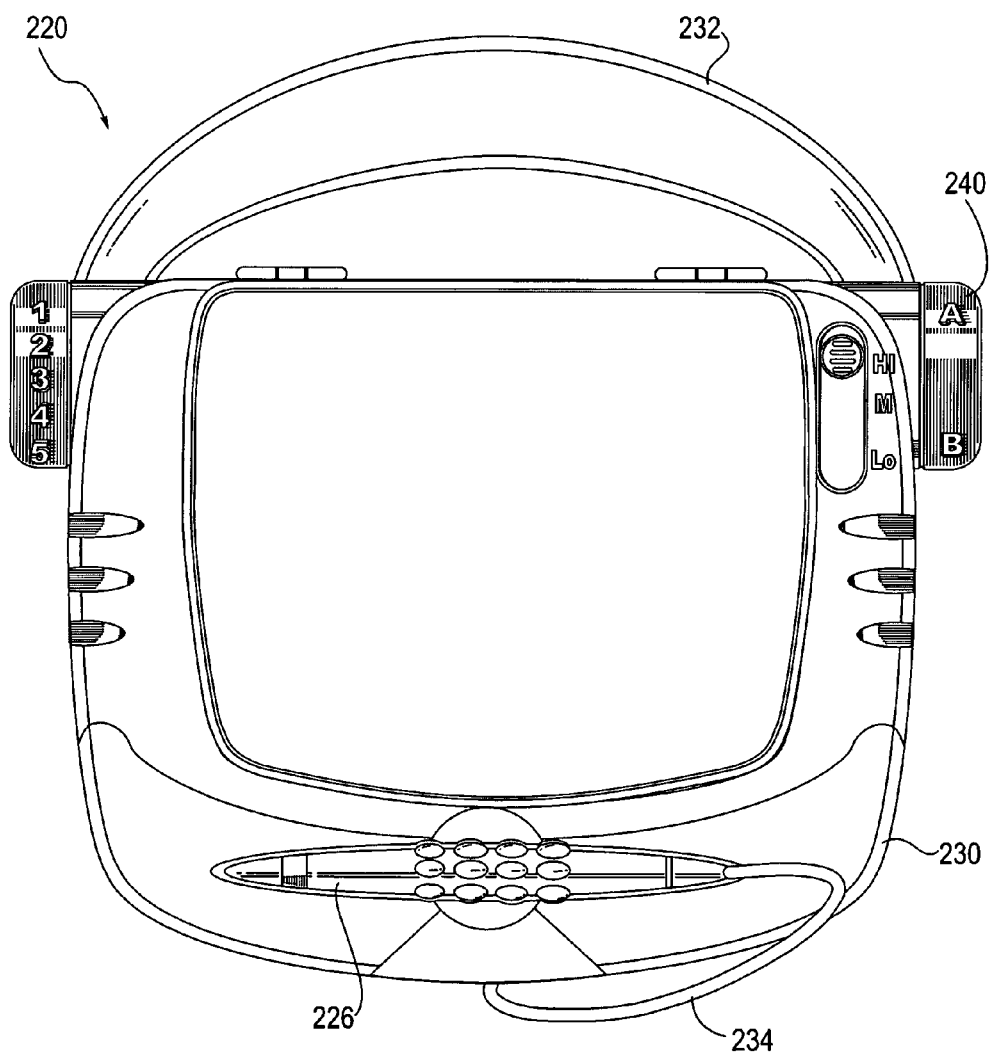

The stylus 226 is positioned in the base/center of the apparatus 220 and connected to the housing 230 by a cord 234. In addition, the apparatus 220 includes a keypad 236 comprised of a variety of buttons 238, wherein each button 238 represents a letter of an alphabet. Each button 238 is activated by touch. To choose a letter to practice writing, the user presses the button 238 corresponding to the letter of choice. The user may select the uppercase or lowercase version of the letter by manipulating a case selector 240. Volume may be controlled by a volume control 242; in this embodiment, a three position (low, medium, high) switch on the front face of the housing 230. In addition, the apparatus 220 may include a cover 244. The cover 224 may be closed, as shown in FIG. 12B, to cover the keypad 236 and display 222. Or, the cover 224 may be opened, as shown in FIG. 12A, revealing a reference alphabet that the user may view as a reminder as to the shape of various uppercase and lowercase letters of the alphabet.

Figure 13:
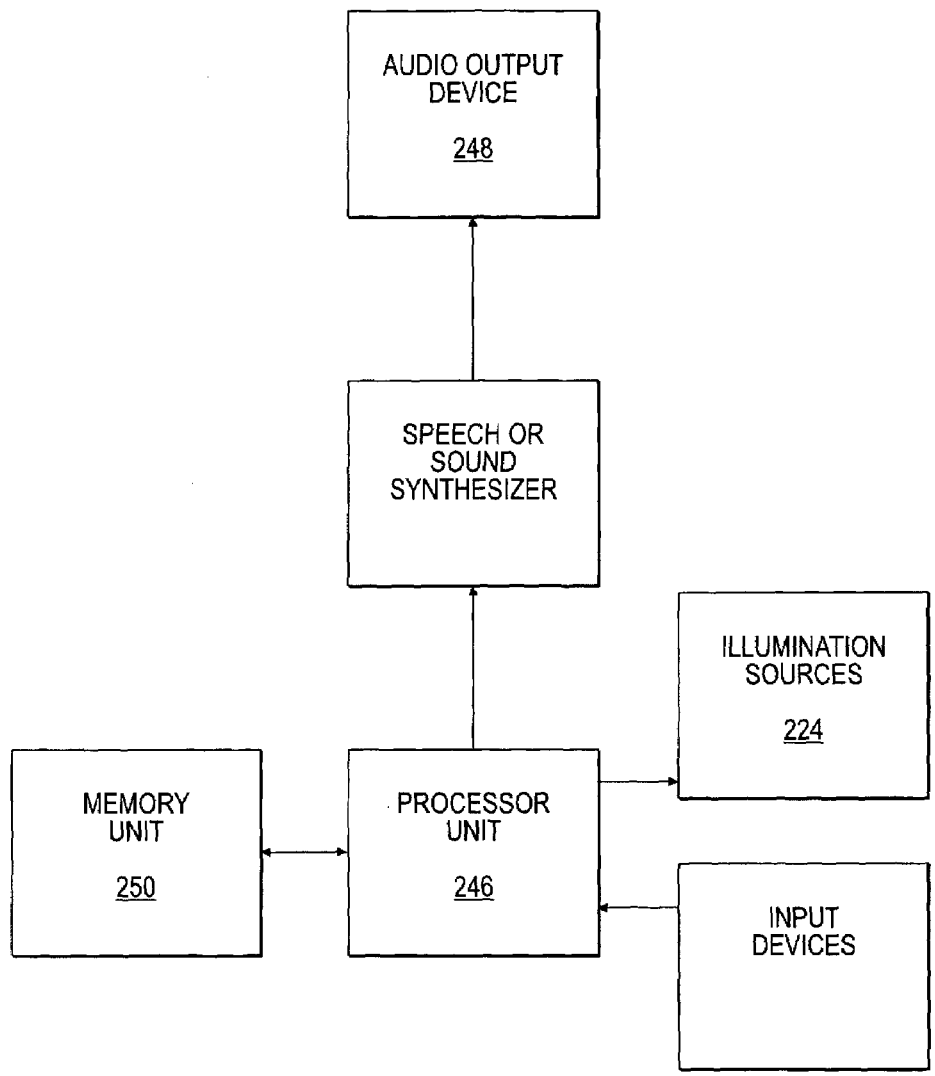
FIG. 13 is a schematic block diagram illustrating various internal components of the apparatus included in one erasable magnetic display medium with illumination embodiment of the present invention.

In preferred embodiments, as illustrated in FIGS. 12A-12B and in FIG. 13, the interactive learning apparatus 220 includes (a) a housing 230, (b) a processor unit 246 in the housing 230, (c) an audio output device 248 coupled to the processor unit 246, (d) an erasable display 222 coupled to the housing 230, wherein the erasable display 222 forms a display region, (e) an array of illumination sources 224 in the display region; and (f) a memory unit 250 coupled to the processor unit 246, wherein the memory unit 250 comprises (i) code for illuminating a predetermined number of illumination sources 224 in the array of illumination sources to display an image, and (ii) code for allowing a user to draw on the erasable display 222 to attempt to reproduce the displayed image.

Figure 14:
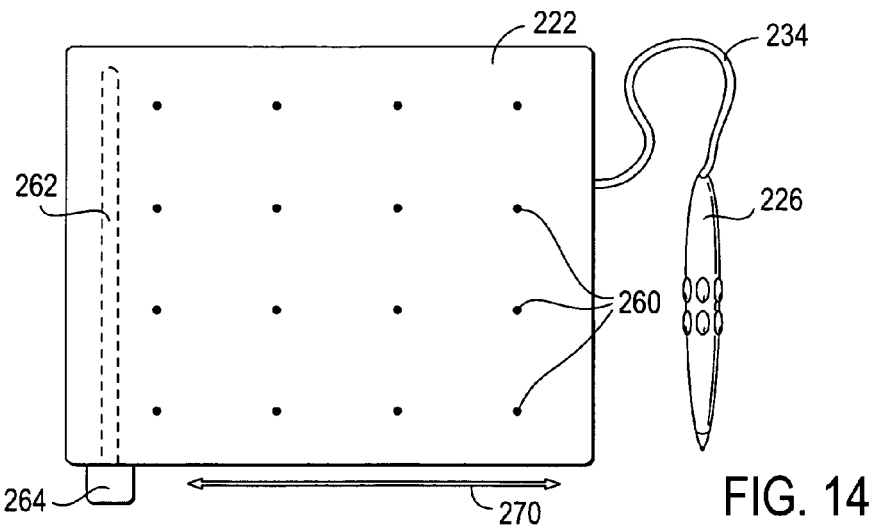
FIG. 14 illustrates an erasable display having matrix of holes through which light from illumination sources may be seen when illuminated.

As described, the interactive learning apparatus 220 teaches the user the basics of writing letters of an alphabet by showing the user the stroke order of each letter on the display 222 and allowing the user to make the stroke marks of the letter on the display 222 with the stylus 226. FIGS. 14-21 illustrate an embodiment of this exercise. FIG. 14 illustrates an erasable display 222 having a matrix of holes 260 through which light from illumination sources 224, such as LEDs, may be seen when illuminated. In preferred embodiments, the erasable display 222 is comprised of a magnetrophoretic display panel having a front piece of transparent or semi-transparent plastic, a middle honeycombed or hexagonal plastic lattice and a back piece of transparent or semi-transparent plastic. Typically, the walls of the middle, honeycombed lattice are less than 0.02 inches (0.5 mm) thick.

Each cell of the lattice is filled with a thick liquid suspension or dispersion medium filled with tiny magnetic particles. The lattice structure ensures that there is an even distribution of magnetic particles across the display 222. The liquid dispersion medium is designed so that the particles can be pulled through the liquid in response to magnetic force applied by a magnet, such as the magnetic tip 228 of the stylus 226. The particles do not change position, such as by floating or sinking, due to special properties of the liquid. In particular, the liquid is thick enough to prevent the magnetic particles from sinking. Typically, the liquid is comprised of water, glycol or organic solvent/oil, and the liquid has a particulate thickener, such as waxes (olefinic polymer, olefinic copolymer, wax, etc.), fatty acid derivatives (fatty acid amide, dextrin fatty acid ester, etc.), or metal soap, to name a few. The magnetic particles are typically dark, small and fine (approximately 10 microns). Such particles may be comprised of any suitable material including magnetic oxides (such as black magnetite, gamma-hematite, chromium oxide, or ferrite) and/or magnetic alloys (such as iron, cobalt or nickel). Example magnetrophoretic display panels include Magna Doodle™ and Doodle Pro™ (manufactured by Fisher-Price®).

FIG. 14 also illustrates an erase lever or a magnetic bar 262 having a magnetic bar handle 268. The magnetic bar 262 is positioned beneath the display 222 and is moveable back and forth across the display 222 (as indicated by arrow 270) by the handle 264. As the bar 262 moves beneath the display 222, the magnetic particles in the liquid are pulled through the liquid in response to magnetic force applied by a magnetic bar 262. Thus, the magnetic particles are pulled away from the front of the display 222 and are no longer visible. This "erases" the display 222. FIG. 14 also illustrates a stylus 226 attached to the apparatus 220 by a cord 234.

Figure 15:
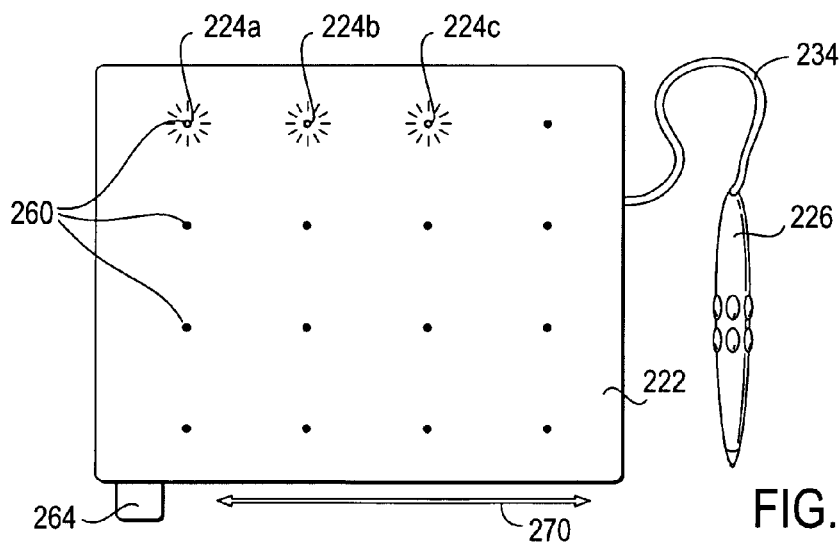
FIG. 15 illustrates illumination sources indicating a first instructional stroke.

The apparatus 220 includes a variety of modes of play which are selectable by a mode selector switch. The user may select a "Learn Mode" which teaches the user writing of uppercase and lowercase letters and numbers 0-9. In the Learn Mode, the user selects a letter by pressing the button 238 corresponding to the letter of choice (in this example, T) and selects the case by manipulating the case selector 240 (in this example, uppercase). The user may hear an audio output such as "Letter T says T and ta, as in top! Here's how you write the uppercase letter T!". Referring to FIG. 15, illumination sources 224a, 224b, 224c then illuminate and shine through their respective holes 260 in the erasable display 222 to indicate a first instructional stroke 280 in drawing the letter T. The illumination sources 224a, 224b, 224c may illuminate one at a time, such as from left to right, to animate the directional nature of the stroke 280. The user may hear an audio output such as drawing music during illumination. In some embodiments, the drawing music goes up or down a scale as the illumination sources 224a, 224b, 224c are individually illuminated.

Figure 16:
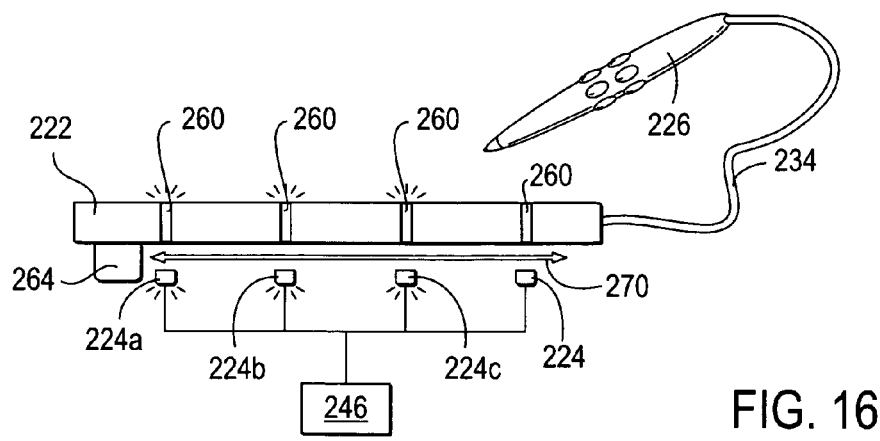
FIG. 16 provides a cross-sectional view of the embodiment of the apparatus illustrated in FIG. 15.

FIG. 16 provides a cross-sectional view of the embodiment of the apparatus 220 illustrated in FIG. 15. As shown, the display 222 includes a plurality of holes 260 which pass therethrough. The holes 260 are sealed so that liquid within the display is not able to leak through the holes 260. Likewise, the transparent or semi-transparent surfaces of the display 222 typically cover the holes 260 so that the front surface of the display 222 is smooth for writing purposes. Illumination sources 224 are disposed beneath the display 222, as shown, and are controlled by the processor unit 246. FIG. 16 illustrates illumination sources 224a, 224b, 224c illuminated to indicate the first instructional stroke 280 of the letter T. The apparatus 220 may then continue to illuminate additional illumination sources to indicate the remaining instructional strokes in drawing the letter T.

The user may hear an audio output such as "Now it's your turn! Draw along with me!". The letter T may then flash on the display 222 and disappear. The illumination sources 224a, 224b, 224c may then again illuminate one at a time to animate the directional nature of the first instructional stroke 280. The user then follows the stroke 280 with the stylus 226, as shown in FIG. 17, creating a first user mark 282. As mentioned, the stylus 226 has a magnetic tip 228, as illustrated in FIG. 18. Movement of the magnetic tip 228 across the display 222 attracts magnetic particles 284 as it moves, pulling the magnetic particles 284 through liquid 286 within the lattice structure 288 of the display 222. The particles 284 remain near the surface of the display 222, as shown in FIG. 19, forming the first user mark 282.

Figure 20:
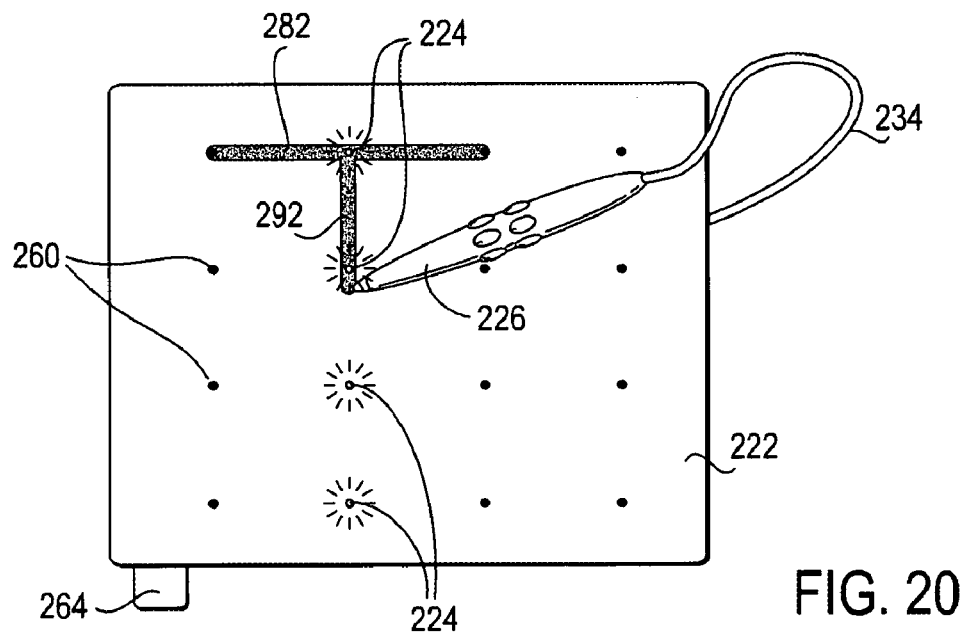
FIG. 20 illustrates illumination sources illuminating a second instructional stroke.
Figure 21:
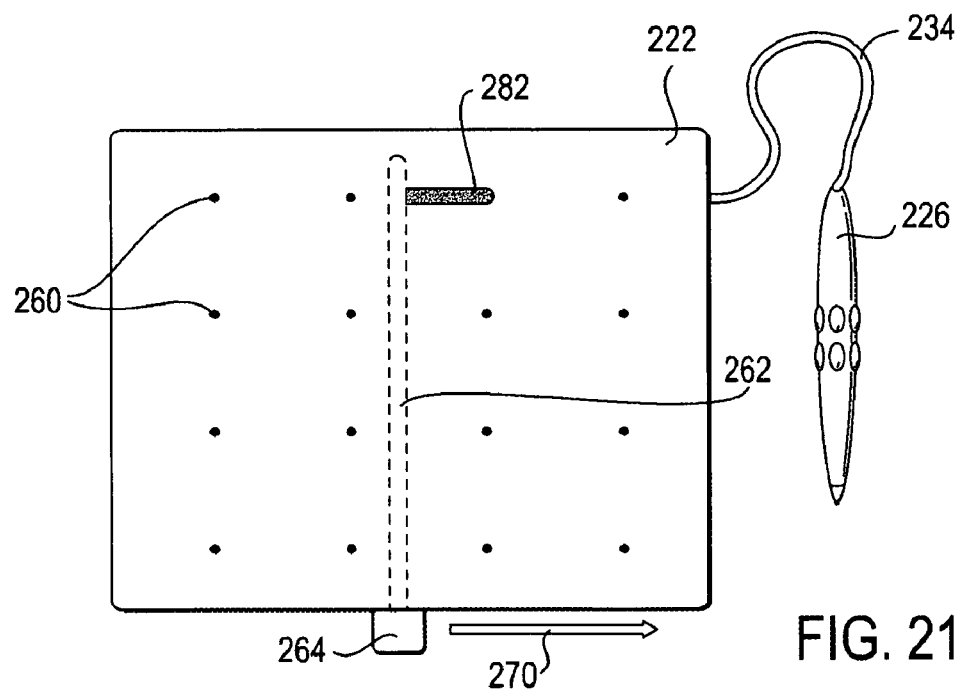
FIG. 21 illustrating actuating an erase lever to erase the erasable display medium.

Referring to FIG. 20, the illumination sources 224 may then again illuminate one at a time to animate the directional nature of a second instructional stroke 290. The user then follows the stroke 290 with the stylus 226 creating a second user mark 292. Once the letter T has been drawn by the user, the user may hear an audio output such as "That's the letter T! Great job!". After a pause, such as a 2 second pause, the user may then hear "Time to erase!". The user may erase the letter with the use of the magnetic bar 262. FIG. 21 illustrates movement of the magnetic bar 262 across the display 222 by advancing the handle 264 in the direction of the arrow 270. As the magnetic bar 262 passes underneath the first and second user marks 282, 292, the magnetic particles 284 are drawn toward the magnetic bar 262, removing the marks 282, 292 from the surface of the display 222 thereby erasing the letter T. FIG. 21 illustrates only a portion of the first user mark 282 remaining in the area in which the bar 262 has not yet passed.

Once the letter has been erased, the user may then hear an audio output such as "Hit GO to write the same letter. Or turn the wheel to write something new! It's up to you!"

Embodiments of the invention also include computer readable media for performing any of the functions described above. For example, embodiments of the invention include computer readable media including computer code for performing the functions shown in FIGS. 6A-6F, 10A-10F, or 11A-11D. The computer readable media may be portable and may be in the form of disks, tapes, or data cartridges, or could be internal to a larger apparatus.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. Further, although the embodiments of the present invention are described and illustrated to teach the basics of writing letters of the alphabet, the embodiments are equally applicable to writing numbers, symbols and other images.

Also, it should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software. Any of the functions described above may be preprogrammed into a memory unit (or other computer readable medium) according to methods known to those of skill in the art using any suitable programming language).

All references, patent applications, and patents mentioned above are herein incorporated by reference in their entirety for all purposes. None of them are admitted to be prior art to the presently claimed inventions.

What is claimed is:

1. An interactive learning apparatus comprising:
   (a) a housing;
   (b) a display screen on the housing;
   (c) an electronic position location system, wherein the electronic position location system includes a processor that is capable of determining a location of a selected region of the display screen;
   (d) a stylus for selecting regions on the display screen; and
   (e) a memory device operatively coupled to the processor, the memory device comprising
      (i) code for displaying an instructional stroke on the display screen,
      (ii) code for displaying a starting point for drawing the instructional stroke on the display screen,
      (iii) code for displaying a user mark over the instructional stroke on the display screen drawn by a user with the stylus using the starting point as a reference point, and
      (iv) code for removing the instructional stroke from the display screen while the user mark remains.

2. An apparatus as in claim 1, wherein the instructional stroke forms at least a portion of a letter of an alphabet.

3. An apparatus as in claim 1, wherein the instructional stroke is a first instructional stroke, the starting point is a first starting point, and the user mark is a first user mark, and wherein the memory unit further comprises
   (iv) code for displaying a second starting point for drawing a second instructional stroke on the display screen and
   (v) code for displaying a second user mark drawn by the user using the second starting point as a reference point for drawing the second user mark.

4. An apparatus as in claim 1, wherein the memory unit further comprises code for scoring the accuracy of the drawing of the user mark in relation to the instructional stroke.

5. An apparatus as in claim 4, further comprising an audio output device coupled to the processor unit and wherein the memory unit further comprises code for providing an audio output from the audio output device indicating the accuracy to the user.

6. An apparatus as in claim 1, wherein the memory unit further comprises code for improving line quality of the user mark.

7. An interactive learning apparatus comprising:
   (a) a housing;
   (b) a display screen on the housing;
   (c) an electronic position location system, wherein the electronic position location system includes a processor that is capable of determining a location of a selected region of the display screen;
   (d) a stylus for selecting regions on the display screen; and
   (e) a memory device operatively coupled to the processor, the memory device comprising
      (i) code for displaying an instructional stroke on the display screen,
      (ii) code for displaying a starting point for drawing the instructional stroke on the display screen, and
      (iii) code for displaying a user mark tracing the instructional stroke on the display screen drawn by a user with the stylus using the starting point as a reference point,
   wherein the memory device further comprises code for removing the instructional stroke from the display screen while the user mark remains.

8. An apparatus as in claim 7, wherein the user mark has a different thickness than the instructional stroke.

9. An apparatus as in claim 7, wherein the user mark has a different color than the instructional stroke.

* * * * *